US009512264B2

(12) United States Patent
Condo et al.

(10) Patent No.: US 9,512,264 B2
(45) Date of Patent: Dec. 6, 2016

(54) DRY, SURFACE-MODIFIED NANOCALCITE

(75) Inventors: Peter D. Condo, Lake Elmo, MN (US); William J. Schultz, North Oaks, MN (US); Chad A. Haraldson, Apple Valley, MN (US); Jung-Sheng Wu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/991,634

(22) PCT Filed: Dec. 12, 2011

(86) PCT No.: PCT/US2011/064331
§ 371 (c)(1),
(2), (4) Date: Jun. 5, 2013

(87) PCT Pub. No.: WO2012/082582
PCT Pub. Date: Jun. 21, 2012

(65) Prior Publication Data
US 2013/0253139 A1    Sep. 26, 2013

Related U.S. Application Data

(60) Provisional application No. 61/561,363, filed on Nov. 18, 2011, provisional application No. 61/422,417, filed on Dec. 13, 2010.

(51) Int. Cl.
| *C08K 3/26* | (2006.01) |
| *B05D 3/02* | (2006.01) |
| *C08L 63/00* | (2006.01) |
| *C08G 59/14* | (2006.01) |
| *C08K 9/08* | (2006.01) |
| *C09C 1/02* | (2006.01) |
| *C08K 9/04* | (2006.01) |
| *C09C 3/04* | (2006.01) |
| *C09C 3/08* | (2006.01) |
| *C09C 3/10* | (2006.01) |

(52) U.S. Cl.
CPC ............. *C08G 59/1438* (2013.01); *C08K 9/04* (2013.01); *C08K 9/08* (2013.01); *C08L 63/00* (2013.01); *C09C 1/02* (2013.01); *C09C 1/021* (2013.01); *C01P 2004/51* (2013.01); *C01P 2004/52* (2013.01); *C01P 2004/62* (2013.01); *C01P 2004/64* (2013.01); *C09C 3/041* (2013.01); *C09C 3/08* (2013.01); *C09C 3/10* (2013.01)

(58) Field of Classification Search
None
See application file for complete search history.

(56) References Cited

U.S. PATENT DOCUMENTS

| 4,159,312 | A | 6/1979 | Shibazaki et al. |
| 4,447,564 | A | 5/1984 | Grimmer |
| 6,342,100 | B1 | 1/2002 | Nover et al. |
| 7,709,090 | B2 | 5/2010 | Nover et al. |
| 2004/0242748 | A1 | 12/2004 | Takahashi et al. |
| 2007/0258877 | A1* | 11/2007 | Nover et al. .................. 423/430 |
| 2007/0295446 | A1* | 12/2007 | Behr ..................... C08F 283/00 156/275.7 |
| 2011/0028605 | A1* | 2/2011 | Nelson et al. ................ 523/453 |
| 2011/0079668 | A1* | 4/2011 | Nelson et al. ................ 241/30 |
| 2011/0245376 | A1* | 10/2011 | Schultz et al. ................ 523/400 |
| 2012/0059086 | A1* | 3/2012 | Nelson et al. ................ 523/340 |
| 2012/0244338 | A1* | 9/2012 | Schultz et al. ................ 428/323 |
| 2012/0245253 | A1* | 9/2012 | Schultz et al. ................ 523/435 |

FOREIGN PATENT DOCUMENTS

| EP | 2 199 348 | 6/2010 | |
| JP | S56-860 | 1/1981 | |
| WO | WO 2009120868 A2 * | 10/2009 | ............... C08K 9/04 |
| WO | WO 2009152404 A1 * | 12/2009 | ............... C08F 2/44 |
| WO | WO 2010-080459 | 7/2010 | |
| WO | WO 2010138440 A1 * | 12/2010 | ............... B01J 19/18 |
| WO | WO 2011075126 A1 * | 6/2011 | ............... C08K 3/26 |
| WO | WO 2011084380 A1 * | 7/2011 | ............... C08K 3/20 |

OTHER PUBLICATIONS

PCT International Search Report from PCT/US2011/064331 mailed on Jul. 11, 2012, 4 pages.
Van Krevelen, D.W., "Properties of Polymers; Their Correlation with Chemical Structure; Their Numerical Estimation and Prediction from Additive Group Contributions" $3^{rd}$ edition, Chapter 7, 189-225 (1990).
Perdew et al., "Generalized Gradient Approximation Made Simple", Physical Review Letters, vol. 77, No. 18, (1996) pp. 3865-3868.
Yuan, "The effect of crystallization pressure on macromolecular structure, phase evolution, and fracture resistance of nano-calcium carbonate-reinforced high density polyethylene", *Materials Science and Engineering A: Structural Materials: Properties, Microstructure & Processing*, Lausanne, CH., vol. 527, No. 24-25, (Sep. 25, 2010) pp. 6699-6713.
Database WPI Week 201032 Thomson Scientific, London, GB; AN 2010-D57108 XP002734860, & CN 101 671 493 A (Hunan Boshen Ind. Co. Ltd.) Mar. 17, 2010.

* cited by examiner

*Primary Examiner* — Michael J Feely
(74) *Attorney, Agent, or Firm* — Philip P. Soo

(57) ABSTRACT

Nanoparticle compositions including calcite and a surface-modifying agent bonded to the calcite are described. The surface-modifying agent includes a binding group bonded to the calcite and a compatiblizing segment. The compatiblizing segment includes at least one of a polyethylene oxide, a polypropylene oxide, a polyester, a polyamide, or a combination thereof. The composition includes less than 2 wt. % solvents and/or resins. Methods of preparing nanoparticle compositions are also described.

11 Claims, No Drawings

DRY, SURFACE-MODIFIED NANOCALCITE

TECHNICAL FIELD

The present disclosure relates to surface-modified nanocalcite. More particularly, the present disclosure relates to dry, surface-modified nanocalcite particles that are readily dispersible in a resin.

SUMMARY

In some embodiments, a nanoparticle composition is provided. The composition includes nanoparticles comprising calcite and a surface-modifying agent bonded to the calcite. The surface-modifying agent includes a binding group bonded to the calcite and a compatiblizing segment. The compatiblizing segment includes at least one of a polyethylene oxide, a polypropylene oxide, a polyester, a polyamide, or a combination thereof. The composition includes less than 2 wt. % solvents and/or resins.

In some embodiments, a method of making a nanoparticle composition is provided. The method includes reducing the size of calcite particles such that the calcite particles have a mean size of no greater than 400 nm. The method also includes surface-modifying the calcite particles with a surface-modifying agent to form surface-modified particles. The method further includes drying the surface-modified particles.

In some embodiments, a method of making a particle-filled resin is provided. The method includes reducing the size of calcite particles such that the calcite particles have a mean size of no greater than 400 nm. The method also includes surface-modifying the calcite particles with a surface-modifying agent to form surface-modified particles. The method further includes drying the surface-modified particles. The method still further includes dispersing the dried, surface-modified particles in a resin to form the particle-filled resin.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Resin systems, including curable resin systems, containing surface-modified nanoparticles are gaining greater acceptance, particularly in the field of fiber composites. Surface-modified nanoparticles have been shown to improve the mechanical properties of such composites and have also been shown to provide processing advantages.

International Patent Application Number PCT/US2009/06839 (Publication Number WO 2010/080459 A1; "Nanocalcite Composites") describes a single process for functionalization of unmodified calcite and dispersion of the calcite in a resin using a combination of high-shear mixing and milling. The resulting composite contains surface-modified calcite well-dispersed in a resin.

In some applications, it may be desirable to provide surface-modified nanoparticles as a dry composition, rather than as a sol of nanoparticles dispersed in water or solvent, or as nanoparticles pre-compounded into a resin. In some embodiments, it may be desirable to disperse the nanoparticles in the resin with conventional high shear mixing equipment rather than using slower, more costly milling processes. In some embodiments, it may be desirable to disperse nanoparticles that have already been surface-modified, rather than attempting to control both the surface-modification and dispersion in a single process.

In some embodiments, if surface-modified nanoparticles could be provided in dry powder form, greater flexibility and cost-efficiencies could be achieved when the surface-modified nanoparticles are compounded into resins. For example, the use of dry particles would eliminate concerns of solvent compatibility with the target resin and cost and process steps associated with subsequent removal of the solvents. Additionally, when the surface-modified nanoparticles are provided pre-compounded in a resin, formulators are limited to the properties of the resin in which the nanoparticles were pre-compounded which may not be compatible with additives, process conditions, or property requirements of the end-use application. Consequently, in some embodiments, dry, readily redispersible, surface-modified nanoparticles may provide the most economical, least complex, and most versatile approach to formulators of resins systems containing surface-modified nanoparticles.

As used herein, "aggregated" and "aggregates" are descriptive of a strong association of particles bound together by, for example, residual chemical treatment, covalent chemical bonds, or ionic chemical bonds. Breakdown of the aggregates into smaller entities is very difficult to achieve. Typically, aggregated particles are not broken down into smaller entities by, for example, shearing forces encountered during dispersion of the aggregated particles in a liquid.

As used herein, "agglomerated" and "agglomerates" are descriptive of a weak association of particles usually held together by charge or polarity. Agglomerated particles can typically be broken down into smaller entities by, for example, shearing forces encountered during dispersion of the agglomerated particles in a liquid.

Generally, compositions of the present disclosure may include dry, surface-modified nanoparticles that are readily redispersible into a resin (i.e., dispersable into a resin without milling and/or the aid of solvents). The surface-modified nanoparticles may include calcite and a surface-modifying agent bonded to the calcite.

In various embodiments, the surface-modifying agents of the present disclosure may include at least a binding group and a compatiblizing segment:

Comp. Seg.-Binding Group;

wherein "Comp. Seg." refers to the compatiblizing segment of the surface-modifying agent.

In some embodiments, the compatiblizing segment may be selected to improve the compatibility of the calcite nanoparticles within a resin. Generally, selection of the compatiblizing group may depend on a number of factors including the nature of the resin, the concentration of the nanoparticles, and the desired degree of compatibility. Exemplary compatiblizing segments useful in the compositions of the present disclosure may include polyalkylene oxides (e.g., polypropylene oxide, polyethylene oxide), polyester, a polyamide, and combinations thereof. In various embodiments, useful compatiblizing segments may have a molecular weight of at least 250, 275, 300, 325, or even at least 350 g/mol (number average molecular weight calculated from the chemical structure).

In some embodiments, the compatiblizing segment may be selected to provide a positive enthalpy of mixing for the surface-modified nanoparticles composition and a resin into which the composition may be dispersed. If the enthalpy of mixing is positive, the dispersion of nanoparticles in a resin is typically stable. To ensure a positive enthalpy of mixing, the solubility parameter of the compatiblizing segment can be matched to the solubility parameter of a resin. In some embodiments, the compatiblizing segment may have a solubility parameter of greater than 15, 17, or 20 $J^{1/2}$ cm$^{-3/2}$ as determined according to *Properties of Polymers; Their Correlation with Chemical Structure; Their Numerical Estimation and Prediction from Additive Group Contributions*, third edition, edited by D. W. Van Krevelen, Elsevier Science Publishers B.V., Chapter 7, 189-225 (1990). In some embodiments, the compatiblizing segment can be selected relative to a resin such that the difference in these solubility parameters is no more than 5, 4, 3, or 2 $J^{1/2}$ cm$^{-3/2}$.

There are several methods known for determining the solubility parameter of a material such as a compatiblizing segment. For example, the solubility parameter of the material can be determined from measurements of the extent of equilibrium swelling of the material in a range of solvents of differing solubility parameters. The solubility parameters of the solvents themselves can be determined from their heats of evaporation. The solubility parameter delta ($\delta$) is related to the cohesive energy $E_{coh}$ and the specific volume V by the relationship $\delta = (E_{coh}/V)^{1/2}$. For solvents of low molecular weight, the cohesive energy is closely related to the molar heat of evaporation $\Delta H_{vap}$ according to $E_{coh} = \Delta H_{vap} - p\Delta V = \Delta H_{vap} - RT$. Thus, $E_{coh}$ and $\delta$ can be calculated from the heat of evaporation of the solvent or from the course of the vapor pressure as a function of temperature. To determine the solubility parameter of the material, a plot of equilibrium swelling of the material versus the solubility parameter of the solvents is generated. The solubility parameter of the material is defined as the point on this plot where maximum swelling is obtained. Swelling will be less for solvents having solubility parameters that are less than or greater than that of the material. Alternatively, there are several known methods for theoretically estimating the solubility parameter of a material based on the additive contributions of functional groups.

In various embodiments, the binding group may bond to the calcite, connecting the surface-modifying agent to the calcite. For example, the bond may be achieved chemically (e.g., covalently or ionically), or physically (e.g., strong physisorptively) attaching). In some embodiments, the surface-modifying agents of the present disclosure may be ionically bonded to (e.g., associated with) the calcite.

In order to retain the surface-modifying agents with the calcite during processing of the compositions, it may be desirable to select binding groups having high bond energies to calcite. Bond energies can be predicted using density functional theory calculations. In some embodiments, the calculated bond energies may be at least 0.6, e.g., at least 0.7 electron volts. Generally, the greater the bond energy the greater the likelihood that the binding group will remain ionically associated with the particle surface. In some embodiments, bond energies of at least 0.8, e.g., at least 0.9, or even at least 0.95 electron volts, may be useful.

In some embodiments, the binding group comprises a phosphonic acid, e.g., surface-functionalizing agents having a formula:

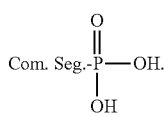

In some embodiments, the binding group comprises a sulfonic acid, e.g., surface-functionalizing agents having a formula:

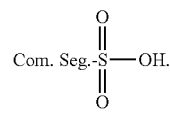

The bond energy to calcite of various common and potential binding groups was determined using density functional theory calculations. Details regarding such calculations are available in Pendrew, J. P.; Burke, K. J.; Ernzerhof, M.; Phys. Rev. Lett. 1996, 3865, 77. The calculated values in electron volts (e.v.) are summarized below.

Calculated bond energy to calcite.

| Binding group | Structure | Bond Energy (e.v.) |
|---|---|---|
| phosphonic acid | R—P(=O)(OH)—OH | 1.18 |
| sulfonic acid | R—S(=O)(=O)—OH | 0.98 |
| phosphinic acid | R—P(=O)(R)—OH | 0.68 |
| sulfinic acid | R—S(=O)—OH | 0.68 |
| hydroxamic acid | R—C(=O)—N(H)—OH | 0.60 |
| carboxylic acid | R—C(=O)—OH | 0.51 |
| sulfamic acid | R—N(H)—SO$_3$H | 0.44 |
| pyrocatechol | HO—C$_6$H$_4$—OH | 0.35 |

In some embodiments, the surface-modifying agent may also comprise a reactive group, i.e., a group capable of reacting with a resin. This can result in the nanocalcite particle being strongly bonded into the resin matrix and may lead to an improvement in the physical properties of the resulting nanocomposite. Generally, the reactive group may be selected based on the nature of a resin into which the nanocalcite composition is to be compounded. In some embodiments, the reactive group may be located on the end of the compatiblizing segment:

Rx. Group-Comp. Seg.-Binding Group;

wherein "Rx. Group" is the reactive group. In some embodiments, the reactive group may be located along the backbone of or pendant to the backbone of the compatiblizing segment. In other embodiments, the reactive group may be located between the compatiblizing segment and the binding group:

Comp. Seg.-Rx. Group-Binding Group.

In illustrative embodiments, a linking group may be present connecting the compatiblizing segment with the binding group:

Comp. Seg.-Linking Group-Binding Group.

For example, in some embodiments, the surface-modifying agent may comprise a polyetheramine. Exemplary polyetheramines include those available under the trade name JEFFAMINE® available from Huntsman Corporation, The Woodlands, Tex. The polyether serves as a compatiblizing segment, while the amine is the linking group linking the compatiblizing segment with the binding group.

In some embodiments, the surface-modifying agent may comprise a zwitterion, i.e., a compound carrying a net charge of zero, but which is capable of carrying a formal positive and negative charge on different atoms. In some embodiments, the formal negative charge may be carried by the binding group. In some embodiments, the formal positive charge may be carried on the nitrogen atom of an amine, e.g., an amine linking group. In such embodiments, the amine may serve as both the linking group and the reactive group.

In various embodiments, the compositions of the present disclosure may include dry, surface-modified calcite nanoparticles. The dry nanoparticles may be in the form of a collection of discrete primary particles (i.e., single crystal particles), particle aggregates, and/or particle agglomerates. For purposes of the present disclosure, including the claims, the "size" of the surface-modified nanoparticles in a composition may be determined as the size of the discrete primary particles and the discrete particle aggregates, following breakdown of any agglomerates into smaller entities. In some embodiments, a mean size of the surface-modified nanoparticles of the present disclosure may be less than 500 nm, 400 nm, or 300 nm. In some embodiments, for example when compounding the surface-modified nanoparticles into resins to produce fibrous composites, it may be desirable to control, e.g., minimize or even eliminate, filtering of the aggregates by the fibers. Larger particles may be filtered or separated from the resin while the mixture is pressured through a highly compressed fiber array in the process of making a continuous fiber composite. This can result in a non-uniform distribution of particles and resin throughout the final composite resulting in decreased physical properties.

In illustrative embodiments, the dry, surface-modified nanoparticle compositions of the present disclosure may be substantially free of solvents (e.g., water, organic liquids) and resins, including monomeric and oligomeric resins. Generally, solvents may be used in the preparation of the dry composition, but such materials are substantially removed prior to compounding of the nanoparticles into a resin. As with any industrial process, it may be impossible or impractical to remove 100% of such residual solvents from the composition. In some embodiments, the dry, surface-modified nanoparticles aggregate compositions of the present disclosure may contain no greater than 5 wt. %, no greater than 2 wt. %, no greater than 1 wt. %, or even no greater than 0.5 wt. % solvents and/or resins.

The present disclosure further relates to particle-filled resin compositions that include the aforementioned dry, surface-modified nanoparticles dispersed in a resin. In some embodiments, thermosetting resins and radiation-curable (e.g., ultraviolet light-cured or electron beam-cured) resins may be used. Suitable resins include, e.g., epoxy resins, polyester resins, bismalimides resins, cyanate ester resins, vinyl ester resins, acrylic resins, urethane resins, phenolic resins, and urethane acrylate resins. In some embodiments, polyepoxide resins, including aliphatic and aromatic polyepoxide resins, may be used. Exemplary epoxy resins include those based on bisphenol A, e.g., those available under the trade name EPON™ from Hexion Specialty Chemicals, Inc., Houston, Tex. In further embodiments, the dry, surface-modified nanoparticles may be dispersed in one or more thermoplastic polymer resins.

In some embodiments, upon dispersion of the surface-modified nanoparticles in a resin to form the particle-filled resin, a mean size of the surface-modified nanoparticles within the resin (i.e., the size of the discrete particle elements within the dispersion, whether primary particles or particle aggregates, after any agglomerates have been broken down into smaller entities, such as by subjecting the dispersion to shearing forces) may be less than 500 nm, 400 nm, or even less than 300 nm.

The present disclosure further relates to methods for making the above-described dry, surface-modified nanoparticle compositions. An exemplary method according to some embodiments may include milling calcite particles to reduce the average size of the particles and, following, prior to, or simultaneous with such milling, surface modifying the calcite particles with a surface-modifying agent to form surface-modified particles. For example, the method may include feeding a mixture of unmodified calcite particles, a surface modifying agent, and a solvent into a wet milling apparatus (e.g., horizontal mill, basket mill), and milling the mixture to achieve simultaneous size reduction and surface modification of the calcite particles. Following milling and surface modification, the method may include processing the wet milled output (i.e., the surface-modified particles in solvent) in a drying apparatus to substantially remove the solvent, and thereby produce the dry, surface-modified nanoparticle compositions of the present disclosure.

A variety of methods may be suitable for drying the wet milled output to form the dry, surface-modified nanoparticle compositions. For example, direct drying techniques such as oven drying or spray drying may be used. For such methods, the heating medium (e.g., hot air) is in direct contact with the wet milled output to facilitate drying. As another example, indirect drying methods may also be used. For such methods, the wet milled output is in indirect contact with the heating medium (e.g. oil) through a heated wall. A combination of direct and indirect drying techniques may also be used. Other suitable drying techniques may include freeze drying and supercritical fluid drying.

In illustrative embodiments, the form of the dry, surface-modified nanoparticle composition may be affected by the drying technique, drying conditions, and/or solvent. For example, the dry, surface-modified nanoparticle composition may take the form of a cake, granules, or fine powder. In some embodiments, the dry, surface modified nanoparticle composition may be further processed to convert it from one dry form to another. For instance, it may be preferable to convert a cake form of a dry, surface-modified nanoparticle composition obtained by oven drying to a fine powder by grinding. By contrast, spray drying the same milled output may yield a fine powder removing a need for further dry processing. A powder or granule form of the dry, surface-modified nanoparticle composition may be more readily redispersed in a resin.

In some embodiments, the present disclosure further relates to methods for making particle-filled resins utilizing the dry, surface-modified nanoparticles of the present disclosure. An exemplary method according to some embodiments may include feeding the dry, surface-modified nanoparticles and a resin (separately, as a mixture, or a combination thereof) into a mixing apparatus (e.g., a disperser, speed mixer, kneader) and applying a shearing force to the mixture to form a dispersion comprising surface-modified calcite well-dispersed in a resin.

In various embodiments, the present disclosure also relates to methods for making fibrous composites utilizing the particle-filled resins of the present disclosure. For example, in some embodiments, reinforcing fibers may be impregnated with the particle-filled resins to form a composite article. Composites may be formed using any known means including, e.g., resin transfer molding, filament winding, tow placement, resin infusion processes, pultrusion process, or traditional prepreg processes. Generally, any fibers suitable for use in fibrous composites may be used. Exemplary fibers include carbon fibers, glass fibers, ceramic fibers, boron fibers, silicon carbide fibers, polyimide fibers, polyamide fibers, and polyethylene fibers. Combinations of materials may also be used. Generally, the form of the fibers is not particularly limited. Exemplary fiber forms include unidirectional array of individual continuous fibers, woven fabric, knitted fabric, yarn, roving, braided constructions, and non-woven mat.

Objects and advantages of this disclosure are further illustrated by the following examples, but the particular materials and amounts thereof recited in these examples, as well as other conditions and details, should not be construed to unduly limit this disclosure.

EXAMPLES

Examples 1-16 and Comparative Examples A-E

Test Descriptions for Examples 1-16 and Comparative Examples A-E

Particle Size Procedure

Particle size of the nanoparticles was measured by laser diffraction using a HORIBA LA-950 (available from Horiba, Kyoto, Japan). The optical model for the calculation used a refractive index of 1.6000 for calcite and 1.3591 for the solvent acetone. The second differential method was used for smoothing and was based on 150 iterations. The calcite dispersion was diluted to approximately 1% solids with acetone. A portion of the diluted sample was then added to the measurement cell, which was filled with acetone, until the transmittance was between the recommended levels of 85% to 95%.

For Examples 1-16, 33, 39, and 41, particle analysis was performed on milled samples. The milled samples contained comminuted, surface-modified calcite in solvent. A portion of each milled sample was diluted in acetone and particle analysis performed as described above. No resin was present in the milled samples. For Examples 17-32, 34-38, 40, 42, and Comparative Examples A-H particle analysis was performed on mixed samples of dry, surface-modified calcite and resin. A portion of each mixed sample was diluted in acetone and particle analysis performed as described above. The quality of the dispersion and effectiveness of a given ligand chemistry is judged by the particle size and particle size distribution (peak 1). Good agreement in the particle size for the milled sample without resin and mixed sample with resin indicates an effective ligand chemistry that allows good dispersibility of a dry, surface-modified calcite in a resin using only simple mixing techniques and without the aid of a solvent.

Materials

TABLE 1

Summary of materials referred to throughout Examples 1-16 and Comparative Examples A-E and their sources.

| Material | Description |
| --- | --- |
| SOCAL 31 | Unmodified nanocalcite powder, obtained from Solvay Specialty Chemicals, LTD., Brussels, Belgium under trade designation "SOCAL 31". |
| SOCAL 322 | Fatty acid-modified nanocalcite powder, obtained from Solvay Specialty Chemicals, LTD., Brussels, Belgium under trade designation "SOCAL 322". |
| NPCC 201 | Fatty acid-modified nanocalcite powder, obtained from NanoMaterials Technology, LTD., Singapore under trade designation "NPCC 201". |
| EPON 828 | Epoxy resin, obtained from Hexion Specialty Chemicals, Columbus, OH under trade designation "EPON 828". |
| SR440 | Isooctyl acrylate, obtained from Sartomer Company, Inc., Exton, PA under trade designation "SR440". |
| SR259 | Polyethylene glycol diacrylate, obtained from Sartomer Company, Inc., Exton, PA under trade designation "SR259". |
| HDODA | Hexanediol Diacrylate, obtained from Cytec Industries, Inc., Woodland Park, NJ |
| SR247 | Neopentyl glycol diacrylate, obtained from Sartomer Company, Inc., Exton, PA under trade designation "SR247". |
| SR351 | Tetramethylolpropane triacrylate, obtained from Sartomer Company, Inc., Exton, PA under trade designation "SR351". |
| MEK | Methylethylketone (solvent), obtained from Alfa Aesar, Ward Hill, MA. |

TABLE 2

List of ligand materials referred to throughout the Examples and their sources.

| Description | MW1 (g/mol) | Chemical structure | Source |
| --- | --- | --- | --- |
| Carboxylic Acids | | | |
| MEAA | 134 | 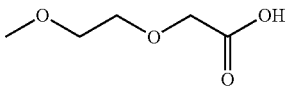 | Sigma-Aldrich, St. Louis, MO |

TABLE 2-continued

List of ligand materials referred to throughout the Examples and their sources.

| Description | MW1 (g/mol) | Chemical structure | Source |
|---|---|---|---|
| MEEAA | 178 | 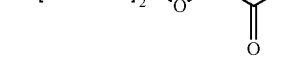 | Sigma-Aldrich, |
| PEG acid | 264 |  | 3M Company St. Paul, MN, USA |
| PEG acid | 440 | 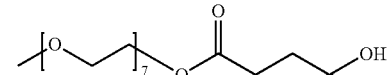 | 3M Company |
| PEG acid | 660 |  | 3M Company |
| JAA | 607 | 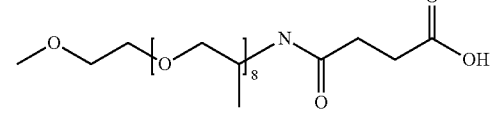 | 3M Company |
| Maleates | | | |
| PEG maleate | 350 | 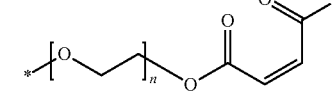 | 3M Company |
| JMA | 695 | 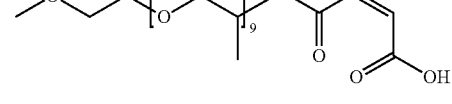 | 3M Company |
| Phosphorous binding groups | | | |
| PEG phosphonate | 184 | 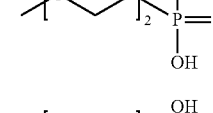 | 3M Company |
| PEG phosphonate | 448 | 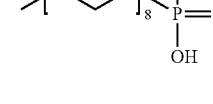 | 3M Company |
| PEG phosphonate | 650 | 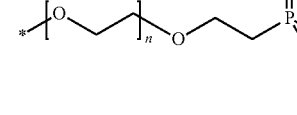 | 3M Company |
| PAM-100 | ~400 | 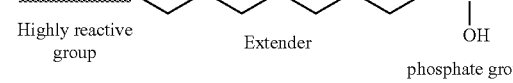 | Rhodia Boulogne-Billancourt, France |

TABLE 2-continued

List of ligand materials referred to throughout the Examples and their sources.

| Description | MW1 (g/mol) | Chemical structure | Source |
| --- | --- | --- | --- |
| Disperbyk-111 | trade secret | phosphoric acid polyester | BYK-Chemie GMBH, Wesel, Germany |
| *Sulfonates* | | | |
| JAS (m = 1, n = 9) | 720 | $H_3C-[O\smile]_m-[O\smile]_n-N-\smile-S(=O)_2-OH$ | 3M Company |
| JAS (m = 31, n = 10) | 2,197 | $H_3C-[O\smile]_m-[O\smile]_n-N-\smile-S(=O)_2-OH$ | 3M Company |
| *Other* | | | |
| JA hydroxamic acid | 685 | methoxy-[O-CH$_2$CH$_2$]$_9$-N-C(=O)-C(=O)-N(H)-O- (hydroxamic acid terminus) | 3M Company |

[1] Number average molecular weight calculated from the chemical structure of the ligand

Examples 1-16

Examples 1-16 are milled dispersions prepared with calcite (SOCAL 31), methylethylketone (MEK) solvent, and ligands with different binding groups and compatibilizing groups, and with and without reactive groups.

Particle size reduction and functionalization of the calcite were performed simultaneously in a horizontal mill (a MINICER mill (0.15 Liter) or a LABSTAR mill (0.6 Liter) (both mills available from NETZCH Fine Particle Technology, Exton, Pa.)). Either mill was equally suitable for carrying out the Examples 1-16. Both the MINICER and LABSTAR mills were equipped with zirconia-lined chamber and agitator, and used in a zeta-configuration. For milling in the MINICER, water was used as the seal fluid, and the media was a 0.2 mm yttrium-stabilized zirconia. For milling in the LABSTAR, 1-methoxy-2-propanol was used as the seal fluid, and the media was a 0.5 mm yttrium-stabilized zirconia. The seal fluid was cooled with house water to maintain the seal temperature below 95° C. The milling media loading for each mill was 80-90% of the chamber volume.

A premix was prepared with 50 parts by weight calcite (SOCAL 31), 50 parts by weight MEK, and 7.5 parts by weight ligand. The actual weights of calcite, MEK, and ligand making up the premix for each of Examples 1-16 are summarized in Table 3 below. To prepare the premix, the MEK was placed in a stainless steel container. To the MEK was added the ligand which acts as a functionalizing agent (aka surface-modifying agent or dispersant) for the calcite. Some ligands, for example JAS, were preheated to 90° C. for ease of handling prior to adding to the MEK. The container with the solvent and ligand was secured to a disperser equipped with an f-blade (DISPERMAT CN-10, obtained from BYK-Gardner, Columbia, Md.). The f-blade was lowered into the container with the solvent and ligand and mixing was initiated at low speed. The unmodified calcite powder (SOCAL 31) was gradually added to the container. The speed of the disperser was gradually increased as the viscosity of the premix increased. Mixing continued until a uniform mixture was produced. The premix was then transferred to a jacketed vessel connected to a peristaltic pump (MASTERFLEX L/S, available from Cole-Parmer Instrument Company, Vernon Hills, Ill.) to circulate material between the jacketed vessel and the mill. The flow rate set point for both mills was 250 milliliters per minute. The temperature of the dispersion during milling was controlled as summarized in Table 3.

Samples were collected during the milling process to determine the size of the calcite particles. Early in the milling process, particle size analysis as described above showed a bimodal distribution of calcite particles. With increased milling time, the magnitude of the distribution peak for the larger particle size decreased and that of the smaller particle size increased. The milling was judged complete when the sample exhibited the single peak of the smaller particle size distribution. Table 3 summarizes the milling time and final mean calcite nanoparticle size and distribution (peak 1) for the dispersions. With the exception of Examples 9-11, all the ligands studied resulted in dispersions with a final nominal mean particle size of about 250 nm and a single particle size distribution (Peak 1=100%). Example 9 was too viscous to mill. Examples 10 and 11 had two particle size distributions where the 250 nm size distribution represented 35 and 81 percent of the particles, respectively.

Dry, surface-modified calcite powders were prepared from the dispersions of Examples 1-16. With the exception of Example 9, the milled dispersions of Examples 1-16 were dried in a DESPATCH QMax forced air convection oven (commercially available from Despatch, Minneapolis, Minn.) to remove solvent. Milled dispersion for each Example was poured into a shallow aluminum tray and placed in the preheated 120° C. oven. A maximum of two trays were dried in the oven at one time. After five minutes of drying time, the samples were mixed with a wooden spatula to break up a skin that formed on the surface of the mixture. Liquid solvent was still visible in the sample after 5 minutes. After 10 minutes, the samples were again mixed and given a coarse grind with a wooden spatula. No liquid was visible in the samples after 10 minutes. After 20 minutes, the dried samples were removed from the oven and again given a coarse grind with a wooden spatula. The oven dried samples was then ground to a fine powder with an MF 10 microfine grinder (available from IKA Works, Inc, Wilmington, Del.). It is believed that the foregoing drying and coarse grind operations do not affect the mean particle size of surface-modified calcite particles, as provided in Table 3 (i.e., the mean particle size of the primary particles and the particle aggregates).

in a stainless steel kettle. The liquid epoxy was preheated to 90° C. for ease of handling. The kettle was then secured to a disperser equipped with an f-blade (Dispermat CN-10 high shear disperser, available from BYK-Gardner, Columbia, Md.). The f-blade was then lowered into the kettle and stirring initiated at low speed. The dry, ligand-modified calcite powder was then gradually added to the kettle and the disperser speed increased to a maximum of 5,500 rpm. Mixing was allowed to continue for an arbitrary 20 minutes.

The compounding results are summarized in Table 4. As shown, a variety of binding groups were shown to result in dispersible calcite nanoparticles. With the exception of Examples 17, 18, and 25, the mean particle size of the calcite nanoparticles in the nanocomposite was consistent with that of the corresponding dispersions of Examples 1-16 indicating that the dry, ligand-modified calcites could be readily

TABLE 3

Summary of milling time and mean particle size and distribution (peak 1) for the Examples 1-16

| Example | Ligand | MW Ligand (g/mol) | Wt. SOCAL 31 (g) | Wt. MEK (g) | Wt. Ligand (g) | Milling Temp. (° C.) | Milling Time (hr:min) | Mean Particle Size (μm) | Peak 1 (%) |
|---|---|---|---|---|---|---|---|---|---|
| 1 | MEAA | 134 | 375 | 375 | 28 | 37 | 0:30 | 0.259 | 100 |
| 2 | MEEAA | 178 | 375 | 375 | 28 | 39 | 0:30 | 0.247 | 100 |
| 3 | PEG acid | 264 | 350 | 350 | 26 | 25 | 0:30 | 0.253 | 100 |
| 4 | PEG acid | 440 | 375 | 375 | 28 | 26 | 0:30 | 0.251 | 100 |
| 5 | PEG acid | 660 | 375 | 375 | 28 | 27 | 0:30 | 0.252 | 100 |
| 6 | JAA | 607 | 350 | 350 | 26 | 23 | 0:30 | 0.234 | 100 |
| 7 | PEG maleate | 350 | 375 | 375 | 28 | 28 | 0:30 | 0.256 | 100 |
| 8 | JMA | 695 | 350 | 350 | 26 | 25 | 0:30 | 0.231 | 100 |
| 9 | PEG phosphonate | 184 | 350 | 350 | 26 | | too viscous to mill | | |
| 10 | PEG phosphonate | 448 | 350 | 350 | 26 | 22 | 1:00 | 1.680 | 35 |
| 11 | PEG phosphonate | 650 | 350 | 350 | 26 | N.R.[1] | 0:45 | 0.552 | 81 |
| 12 | PAM-100 | ~400 | 375 | 375 | 28 | 27 | 0:30 | 0.262 | 100 |
| 13 | JAS | 720 | 1,250 | 1,250 | 94 | 44 | 0:79 | 0.257 | 100 |
| 14 | JAS | 2,197 | 350 | 350 | 26 | 24 | 0:30 | 0.254 | 100 |
| 15 | JA hydroxamic acid | 685 | 350 | 350 | 26 | 25 | 0:45 | 0.269 | 100 |
| 16 | Disperbyk-111 | trade secret | 375 | 375 | 28 | 38 | 0:30 | 0.265 | 100 |

[1]N.R. = not recorded.

Examples 17-32

Examples 17-32 show preparation of nanocomposites from dry, surface-modified calcite nanoparticles of Examples 1-16 using a simple and solvent-free mixing technique. The nanocomposites of Examples 17-32 were prepared using a simple disperser equipped with an f-blade (Dispermat CN-10 high shear disperser, available from BYK-Gardner, Columbia, Md.). The dry, surface-modified calcite nanoparticles of Examples 1-16 were used to demonstrate dispersibility in resins to form nanocomposites with a simple mixer and without the aid of a solvent. To prepare the nanocomposites, a liquid epoxy (EPON 828) was placed dispersed in the liquid epoxy resin by a simple mixing technique without the aid of a solvent. Examples 17-21 and 25-27 suggest the importance of the compatibilizing segment in determining dispersibility. Examples 17, 18 and 25 which had short or no compatibilizing segments were not dispersible, while Examples 20, 21, 26 and 27 which had longer compatibilizing segments were dispersible. In two cases, Examples 22 and 31, the addition of the reactive segment appeared to result in an increase in viscosity of the nanocomposite but, the calcite nanoparticles were still dispersible.

TABLE 4

Compounding Results for Examples 17-32

| Example | Ligand | MW Ligand (g/mol) | Wt. modified SOCAL 31 (g) | Wt. EPON 828 (g) | Mixing Temp. (° C.) | Mixing Time (hr:min) | Mean Particle Size (μm) | Peak 1 (%) | Viscosity of Mix |
|---|---|---|---|---|---|---|---|---|---|
| 17 | MEAA | 134 | 259 | 160 | 60 | 0:20 | grainy | | very high |
| 18 | MEEAA | 178 | 259 | 160 | 58 | 0:20 | grainy | | very high |
| 19 | PEG acid | 264 | 209 | 139 | 71 | 0:20 | 0.242 | 100 | high |
| 20 | PEG acid | 440 | 259 | 160 | 76 | 0:20 | 0.247 | 100 | low |
| 21 | PEG acid | 660 | 259 | 160 | 75 | 0:20 | 0.246 | 100 | low |
| 22 | JAA | 607 | 225 | 139 | 77 | 0:20 | 0.239 | 100 | high |
| 23 | PEG maleate | 350 | 259 | 160 | 71 | 0:20 | 0.249 | 100 | low |
| 24 | JMA | 695 | 259 | 160 | 76 | 0:20 | 0.224 | 100 | low |

TABLE 4-continued

Compounding Results for Examples 17-32

| Example | Ligand | MW Ligand (g/mol) | Wt. modified SOCAL 31 (g) | Wt. EPON 828 (g) | Mixing Temp. (° C.) | Mixing Time (hr:min) | Mean Particle Size (μm) | Peak 1 (%) | Viscosity of Mix |
|---|---|---|---|---|---|---|---|---|---|
| 25 | PEG phosphonate | 184 | — | — | too viscous to mill | | | | |
| 26 | PEG phosphonate | 448 | 195 | 130 | 82 | 0:20 | 0.245 | 100 | low |
| 27 | PEG phosphonate | 650 | 130 | 80 | 86 | 0:20 | 0.322 | 98 | low |
| 28 | PAM-100 | ~400 | 259 | 160 | 68 | 0:20 | 0.251 | 100 | low |
| 29 | JAS | 720 | 259 | 160 | 93 | 0:20 | 0.250 | 100 | low |
| 30 | JAS | 2,197 | 259 | 160 | 76 | 0:20 | 0.244 | 100 | high |
| 31 | JA hydroxamic acid | 685 | 225 | 139 | 82 | 0:20 | 0.233 | 100 | high |
| 32 | Disperbyk-111 | trade secret | 259 | 160 | 67 | 0:20 | 0.247 | 100 | low |

Example 33

Particle size reduction and functionalization of the calcite were performed simultaneously in a LME-4 (4 aLiter) horizontal mill (available from NETZCH Fine Particle Technology, Exton, Pa.). The LME-4 mill had a stainless steel lined chamber and agitator, and was used in a molinex-configuration. The seal fluid was 1-methoxy-2-propanol and the media was a 0.5 mm yttrium-stabilized zirconia. The seal fluid was cooled with house water to maintain the seal temperature below 95° C. The milling media loading was 80% of the chamber volume.

A premix was prepared with 65 weight percent calcite (SOCAL 31, 12,000 grams), 35 weight percent methylethylketone (MEK) solvent (6,464 grams), and 7.5 weight percent JAS ligand (900 grams) where the JAS ligand concentration is based on the weight of calcite. The MEK was placed in a five gallon pail. To the MEK was added the ligand which acts as a functionalizing agent (aka surface-modifying agent or dispersant) for the calcite. The JAS ligand was preheated to 90° C. for ease of handling prior to adding to the MEK. The pail with the solvent and ligand was secured to a disperser equipped with an f-blade (DISPERMAT CN-10, BYK-Gardner, Columbia, Md.). The f-blade was lowered into the pail with the solvent and ligand and mixing was initiated at low speed. The unmodified calcite powder (SOCAL 31) was gradually added to the pail. The speed of the disperser was gradually increased as the viscosity of the premix increased. Mixing continued until a uniform mixture was produced. The pail containing the premix was then connected to a peristaltic pump (MASTERFLEX L/S, Cole-Parmer Instrument Company, Vernon Hills, Ill.) to circulate material between the pail and the mill. The flow rate set point was 250 milliliters per minute. The temperature of the dispersion during milling was 20° C.

Samples were collected during the milling process to determine the size of the calcite particles. Early in the milling process, particle size analysis showed a bimodal distribution of calcite particles. With time, the magnitude of the distribution peak for the larger particle size decreased and that of the smaller particle size increased. The milling was judged complete after about 2 hours and 28 minutes when the sample exhibited the single peak of the smaller particle size distribution. At the end of milling, the final mean calcite nanoparticle size of 260 nanometers and peak 1 equaled 100% indicating that a single particle size distribution was achieved.

Examples 34-38

Examples 34-38 demonstrated that dry, JAS-modified calcite is readily dispersible in acrylates of varying polarity.

The milled, surface-modified calcite nanoparticle dispersion of Example 33 was spray dried in a SD-20 Spray Dryer (SKS Spray Drying Systems, Randallstown, Md.). The 1.2 m (4 foot) diameter by 3.7 m (12 foot) high spray dryer was operated in a closed loop configuration to maintain an inert atmosphere. The milled dispersion was pumped from a five gallon pail to the spray dryer by a peristaltic pump (MASTERFLEX L/S, Cole Parmer Instrument Company, Vernon Hills, Ill.). The flow rate was set at 200-225 grams per minute. The dispersion was sprayed upward in the spray dryer via an atomizing nozzle. The inlet temperature of the spray dryer was 138-142° C. (281-288° F.) and the outlet temperature was 76-78° C. (169-173° F.). The dried, JAS-modified calcite powder was collected in the bag house.

The dry, JAS-modified calcite nanoparticles were mixed with different liquid acrylates of different polarity in a speed mixer (Model ARV-310 Vacuum Mixer, Thinky USA, Inc., Laguna Hills, Calif.). For each Example, 54 grams of dry, JAS-modified calcite powder was placed in a speed mixer cup. Added to the cup was 50 grams of an acrylate. The calcite powder and acrylate liquid were premixed in the cup with a wooden spatula for about 10 seconds. The premix had low viscosity. The speed mixer cup containing the premix was loaded into the speed mixer and mixed at room temperature for 2 to 4 minutes at a speed of 2,000 revolutions per minute (rpm). For each Example, the resulting calcite nanocomposite was of low viscosity which is indicative of good dispersibility of the calcite in the resin. Particle size analysis showed that the JAS-modified calcite nanoparticles readily dispersed in the acrylates since the mean particle size was nominally the same as in the milled dispersion of Example 33 (see Table 5).

TABLE 5

Summary of mixing time and mean particle size and distribution (peak 1) for Examples 34-38

| Example | Acrylate | Mixing Time (min.) | Mean Particle Size (μm) | Peak 1 (%) | Viscosity of Mix |
|---|---|---|---|---|---|
| 34 | SR440 | 2 | 0.270 | 100 | low |
| 35 | SR259 | 2 | 0.261 | 100 | low |
| 36 | HDODA | 2 | 0.267 | 100 | low |
| 37 | SR247 | 4 | 0.266 | 100 | low |
| 38 | SR351 | 4 | 0.258 | 100 | low |

Comparative Examples A-E

Comparative Examples A-E demonstrate that commercially available fatty-acid-modified calcites are not readily dispersible in acrylates of varying polarity.

A commercially available dry, fatty-acid-modified calcite (NPCC 201) was mixed with the same acrylates by the sample process as in Examples 34-38. The calcite particles had 4.8 weight percent fatty-acid based on the weight of calcite. For each Comparative Example, 52.5 grams of dry, fatty-acid-modified calcite powder was placed in a speed mixer cup. Added to the cup was 50 grams of a liquid acrylate. The calcite powder and the acrylate liquid were premixed in the cup with a wooden spatula for about 10 seconds. The premix was of high viscosity similar to that of a dry paste. The speed mixer cup containing the premix was loaded into the speed mixer and mixed at room temperature for 2 to 4 minutes at a speed of 2,000 rpm. For each Comparative Example, the resulting calcite mixture had high viscosity indicating that the calcite did not disperse well in the resin. Particle size analysis also showed that the fatty acid-modified calcite did not disperse well in the acrylates since the mean particle size was large and peak 1 was much less than 100% (see Table 6).

TABLE 6

Summary of mixing time and mean particle size and distribution (peak 1) for Comparative Examples A-E.

| Example | Acrylate | Mixing Time (min.) | Mean Particle Size (μm) | Peak 1 (%) | Viscosity of Mix |
|---|---|---|---|---|---|
| Comp. A | SR440 | 2 | 12.133 | 7 | high |
| Comp. B | SR259 | 4 | 2.978 | 28 | high |
| Comp. C | HDODA | 4 | 2.381 | 36 | high |
| Comp. D | SR247 | 4 | 3.671 | 12 | high |
| Comp. E | SR351 | 4 | 2.666 | 33 | high |

Example 39

Particle size reduction and functionalization of the calcite were performed simultaneously in a LME-4 (4 Liter) horizontal mill (available from NETZCH Fine Particle Technology, Exton, Pa.). The LME-4 mill had a stainless steel lined chamber and agitator, and was used in a molinex-configuration. The seal fluid was 1-methoxy-2-propanol and the media was a 0.5 mm yttrium-stabilized zirconia. The seal fluid was cooled with house water to maintain the seal temperature below 95° C. The milling media loading was 80% of the chamber volume.

A premix was prepared with 65 weight percent calcite (SOCAL 31, 12,000 grams), 35 weight percent methylethylketone (MEK) solvent (6,464 grams), and 5 weight percent JAS ligand (600 grams) where the JAS ligand concentration is based on the weight of calcite. The MEK was placed in a five gallon pail. To the MEK was added the ligand which acts as a functionalizing agent (aka surface-modifying agent or dispersant) for the calcite. The JAS ligand was preheated to 90° C. for ease of handling prior to adding to the MEK. The pail with the solvent and ligand was secured to a disperser equipped with an f-blade (DISPERMAT CN-10, BYK-Gardner, Columbia, Md.). The f-blade was lowered into the pail with the solvent and ligand and mixing was initiated at low speed. The unmodified calcite powder (SOCAL 31) was gradually added to the pail and mixing continued until a uniform mixture was produced. The pail containing the premix was then connected to a peristaltic pump (MASTERFLEX L/S, Cole-Parmer Instrument Company, Vernon Hills, Ill.) to circulate material between the pail and the mill. The flow rate set point was 250 milliliters per minute. The temperature of the dispersion during milling was 20° C.

Samples were collected during the milling process to determine the size of the calcite particles. Early in the milling process, particle size analysis showed a bimodal distribution of calcite particles. With time, the magnitude of the distribution peak for the larger particle size decreased and that of the smaller particle size increased. The milling was judged complete after about 3 hours and 18 minutes when the sample exhibited the single peak of the smaller particle size distribution.

Example 40

Example 40 demonstrates that dry, JAS-modified calcite is readily dispersible in epoxy resin when the milled JAS-modified calcite is dried using an indirect drying method.

About 2,527 grams of the milled, surface-modified calcite nanoparticle dispersion of Example 39 was dried in a LIST Kneader (CRP 2.5 batch, LIST USA, Inc., Charlotte, N.C.). The jacket of the LIST was oil heated. Vacuum was maintained during drying. The jacket temperature was 70° C. The dried, JAS-modified calcite took the form of granules.

To prepare the nanocomposite, 160 grams of liquid epoxy (EPON 828) was placed in a stainless steel kettle. The liquid epoxy was preheated to 90° C. for ease of handling. The kettle was then secured to a disperser equipped with an f-blade (Dispermat CN-10 high shear disperser, available from BYK-Gardner, Columbia, Md.). The f-blade was then lowered into the kettle and stirring initiated at low speed. 253 grams of the dry, surface-modified calcite granules was then gradually added to the kettle and the disperser speed increased to a maximum of 5,500 rpm. Mixing was allowed to continue for an arbitrary 20 minutes. The final temperature of the mixture reached 119° C. Particle analysis showed the particle size of the mixed sample to be consistent with that of the milled surface-modified calcite in solvent of Example 39 indicating indirect drying is an effective drying method for producing dry, surface modified calcite granules that are redispersible in resin.

Example 41

Particle size reduction and functionalization of the calcite were performed simultaneously in a LME-4 (4 Liter) horizontal mill (available from NETZCH Fine Particle Technology, Exton, Pa.). The LME-4 mill had a stainless steel lined chamber and agitator, and was used in a molinex-configuration. The seal fluid was 1-methoxy-2-propanol and the media was a 0.5 mm yttrium-stabilized zirconia. The seal fluid was cooled with house water to maintain the seal temperature below 95° C. The milling media loading was 80% of the chamber volume.

A premix was prepared with 65 weight percent calcite (12,000 grams), 35 weight percent methylethylketone (MEK) solvent (6,464 grams), and 5 weight percent JAS ligand (600 grams) where the JAS ligand concentration is based on the weight of calcite. The MEK used was recycled from a previous calcite spray drying experiment. The recycled MEK was placed in a five gallon pail. To the recycled MEK was added the ligand which acts as a functionalizing agent (aka surface-modifying agent or dispersant) for the calcite. The JAS ligand was preheated to 90° C. for ease of handling prior to adding to the recycled MEK. The pail with the solvent and ligand was secured to a disperser equipped with an f-blade (DISPERMAT CN-10, BYK-Gardner, Columbia, Md.). The f-blade was lowered into the pail with the recycled solvent and ligand and mixing was initiated at low speed. The unmodified calcite powder (SOCAL 31) was gradually added to the pail and mixing continued until a uniform mixture was produced. The pail containing the premix was then connected to a peristaltic pump (MASTERFLEX L/S, Cole-Parmer Instrument Company, Vernon Hills, Ill.) to circulate material between the pail and the mill. The flow rate set point was 250 milliliters per minute. The temperature of the dispersion during milling was 20° C.

Samples were collected during the milling process to determine the size of the calcite particles. Early in the milling process, particle size analysis showed a bimodal distribution of calcite particles. With time, the magnitude of the distribution peak for the larger particle size decreased and that of the smaller particle size increased. The milling was judged complete after about 2 hours and 55 minutes when the sample exhibited the single peak of the smaller particle size distribution. At the end of milling, the final mean calcite nanoparticle size of 265 nanometers and peak 1 equaled 100% indicating that a single particle size distribution was achieved.

Example 42

Example 42 demonstrates that JAS-modified calcite is readily dispersible in epoxy resin when the milled JAS-modified calcite is made using solvent recycled from previous spray drying experiments.

The milled, surface-modified calcite nanoparticle dispersion of Example 41 was spray dried in a SD-20 Spray Dryer (SKS Spray Drying Systems, Randallstown, Md.). The 1.2 m (4 foot) diameter by 3.7 m (12 foot) high spray dryer was operated in a closed loop configuration to maintain an inert atmosphere. The milled dispersion was pumped from a five gallon pail to the spray dryer by a peristaltic pump (MASTERFLEX L/S, Cole Parmer Instrument Company, Vernon Hills, Ill.). The flow rate was set at 200-225 grams per minute. The dispersion was sprayed upward in the spray dryer via an atomizing nozzle. The inlet temperature of the spray dryer was 138-142° C. (281-288° F.) and the outlet temperature was 76-78° C. (169-173° F.). The dried, JAS-modified calcite powder was collected in the bag house.

To prepare the nanocomposite, 500 grams of liquid epoxy (EPON 828) was placed in a stainless steel kettle. The liquid epoxy was preheated to 90° C. for ease of handling. The kettle was then secured to a disperser equipped with an f-blade (Dispermat CN-10 high shear disperser, available from BYK-Gardner, Columbia, Md.). The f-blade was then lowered into the kettle and stirring initiated at low speed. 712 grams of the dry, surface-modified calcite powder was then gradually added to the kettle and the disperser speed increased to a maximum of 5,500 rpm. Mixing was allowed to continue for an arbitrary 20 minutes. The final temperature of the sample was 90° C. The mean particle size of mixture was 258 nm and peak 1 equaled 100% which is consistent with that of the milled sample thus demonstrating efficient use of recycled solvent to produce a dry, surface modified calcite that is readily dispersible in a resin.

Comparative Examples F-H

Comparative Examples F-H demonstrate that commercially available fatty acid-modified calcites are not readily dispersible in epoxies.

A commercially available dry, fatty acid-modified calcite (SOCAL 322) was mixed with epoxy (EPON 828) by the sample process as in Examples 17-32. The liquid epoxy (EPON 828) was preheated to 90° C. for ease of handling. The epoxy (EPON 828) was then placed in a stainless steel kettle. The kettle was then secured to a disperser equipped with an f-blade (Dispermat CN-10 high shear disperser, available from BYK-Gardner, Columbia, Md.). The f-blade was then lowered into the kettle and stirring initiated at low speed. The dry, fatty acid-modified calcite powder (SOCAL 322) was then gradually added to the kettle and the disperser speed increased to a maximum of 5,500 rpm. Mixing was allowed to continue for an arbitrary 20 minutes.

Comparative Example F was prepared at 50 weight percent calcite and exhibited very high viscosity indicating poor dispersibility of the fatty acid-modified calcite (SOCAL 322) in epoxy (EPON 828). Comparative Example G was prepared at 35 weight percent calcite. Comparative Example G exhibited a lower viscosity than Comparative Example F, but still much higher than the nanocomposites made with epoxy-compatible ligands exemplified in Examples 17-32 that exhibited low viscosity. Comparative Example H was prepared with 10 weight percent calcite, and shows that even at low concentrations and very vigorous mixing, the fatty acid-modified calcite is not readily dispersible in the epoxy. This contrasts with many of the ligand-modified calcites of Examples 17-32 which are readily dispersible in epoxy at very high concentrations and still exhibit low viscosity.

Particle size analysis also showed that the fatty acid-modified calcite did not disperse well in the epoxy since the mean particle size was large and peak 1 was much less than 100% (see Table 7).

TABLE 7

Summary of milling time and mean particle size and distribution (peak 1) for Comparative Examples F-H

| Example | Wt. modified SOCAL 322 (g) | Wt. EPON 828 (g) | Mixing Temp. (° C.) | Mixing Time (hr:min) | Mean Particle Size (μm) | Peak 1 (%) | Viscosity of Mix |
|---|---|---|---|---|---|---|---|
| Comp. F | 210 | 200 | N.R.[1] | 0:20 | 6.917 | 25 | very high |
| Comp. G | 147 | 253 | N.R.[1] | 0:20 | 2.706 | 49 | high |
| Comp. H | 42 | 360 | 87 | 0:20 | 5.321 | 23 | low |

[1]N.R. = not recorded.

Examples 43-88 and Comparative Examples F-L

Materials

The materials used in Examples 43-88 and Comparative Examples F-L are summarized in Table 8.

TABLE 8

Summary of materials used in Examples 43-88 and Comparative Examples F-L.

| Material | Description | Source |
|---|---|---|
| SOCAL 31 | nanocalcite, dry powder, unmodified | Solvay Specialty Chemicals LTD., Brussels, Belgium |

TABLE 8-continued

Summary of materials used in Examples 43-88 and Comparative Examples F-L.

| Material | Description | Source |
| --- | --- | --- |
| NPCC 201 | nanocalcite, dry powder, modified with stearic acid | NanoMaterials Technology LTD Singapore |
| ALBAFIL | nanocalcite, dry powder, unmodified | Specialty Minerals, Inc. New York, NY, USA |
| MULTIFEX MM | nanocalcite, dry powder, unmodified | Specialty Minerals, Inc. |
| JAS | polyetheramine sulfonate | 3M Company, St. Paul, MN, USA |
| JAA | polyetheramine acid | 3M Company |
| PEG-PO3H2 | polyethylene glycol phosphonate | 3M Company |
| D111 | DISPERBYK-111 dispersing additive | BYK-Chemie GmbH Wesel, Germany |
| EPON 825 | epoxy resin | Hexion Specialty Chemicals Columbus, OH, USA |
| EPON 826 | epoxy resin | Hexion Specialty Chemicals |
| EPON 828 | epoxy resin | Hexion Specialty Chemicals |
| EPON 862 | epoxy resin | Hexion Specialty Chemicals |
| EPON 1001 | epoxy resin | Hexion Specialty Chemicals |
| ARALDITE 1273 | epoxy resin | Huntsman Advanced Materials Salt Lake City, UT, USA |
| ARALDITE 1280 | epoxy resin | Huntsman Advanced Materials |
| VE 1398-5 | vinyl ester resin | Ashland, Inc Covington, KY, USA |
| 2-EHA | 2-ethylhexyl acrylate | Sigma Aldrich St. Louis, MO, USA |
| styrene | styrene | Alfa Aesar Ward Hill, MA, USA |
| vinyl toluene | vinyl toluene | TCI America Portland, OR, USA |
| PEGDGE | polypropylene glycol diglycidyl ether | Sigma Aldrich |
| BDDGE | 1,4-butanediol diglycidyl ether | Sigma Aldrich |
| ECHM-ECHC | 3,4-epoxycyclohexylmethyl 3,4 epoxycyclohexanecarboxylate | Sigma Aldrich |
| AGE | allyl glycidyl ether | TCI America |
| BGE | n-butylglycidyl ether | TCI America |
| EHGE | 2-ethylhexyl glycidyl ether | TCI America |
| CHDDGE | 1,4 cyclohexane diol diglycidyl ether (HK107) | Hexion Specialty Chemicals |
| MEK | methylethylketone | Alfa Aesar |

Test Methods for Examples 43-88 and Comparative Examples F-L

Particle Size Procedure. Particle size of the nanoparticles was measured by laser diffraction using a HORIBA LA-950 (Horiba, Kyoto, Japan). The optical model for the calculation used a refractive index of 1.6000 for calcite and 1.3591 for the solvent acetone. The second differential method was used for smoothing and was based on 150 iterations. The calcite dispersion was diluted to approximately 1% solids with acetone. The sample was then added to the measurement cell, which was filled with acetone, until the transmittance was between the recommended levels of 85% to 95%. This procedure has a lower limit of resolution of 150 nm and particles below 150 nm are not included in the calculated mean and peak particle sizes.

Percent Solids Procedure. After drying, the nanoparticle powders were tested to verify that all solvent was removed with a MAX 2000 Moisture Analyzer (Arizona Instrument, Chandler, Ark. USA). Between 1 and 1.5 grams of sample was placed in the analyzer which was programmed to hold temperature at 150° C. for 20 minutes. The instrument was used to monitor the weight of the sample. At the end of 20 minutes, the instrument reading would be 100% solids indicating no solvent was present in the dried powder.

Thermogravimetric Procedure. Thermogravimetric analysis was run using a TA Instruments Model Q500 TGA and its associated software (TA Instruments, New Castle, Del., USA) employing a temperature ramp rate of 20 degrees Celsius (° C.)/minute from 35-900° C. in an air atmosphere. The residual weight was assumed to be the CaO remaining in the sample after volatilizing all organics and carbon dioxide from the calcite. The calcite concentration in the original sample was calculated by dividing the weight percent CaO residue by 0.56.

Glass Transition Temperature Procedure. The glass transition temperature (Tg) was determined with a TA Instruments 912 Differential Scanning calorimeter (TA Instruments, New Castle, Del., USA). The heating rate was 40° C. per minute.

Fracture Toughness Procedure. The fracture toughness (K1c) was measured according to ASTM D 5045-99, except that a modified loading rate of 0.13 cm/min (0.050 in/min) was used. A compact tension geometry was used, wherein the specimens had nominal dimensions of 3.18 cm by 3.05 cm by 0.64 cm (1.25 in by 1.20 in by 0.25 in). The following parameters were employed: W=2.54 cm (1.00 in); a=1.27 cm (0.50 in); B=0.64 cm (0.25 in). Measurements were made on between 6 and 10 samples. Average values for KIC were reported in units of megapascals times the square root of meters, i.e. $MPa(m^{1/2})$. Only those samples meeting the validity requirements of ASTM D 5045-99 were used in the calculations.

Processes.

Milling and Functionalization Process. Milling and Functionalization of the calcite were performed simultaneously in a horizontal mill. One of three horizontal mills was used. A MINICER mill (0.15 Liter), a LABSTAR mill (0.6 Liter), or a LME-4 mill (4 Liter) (each available from NETZCH Fine Particle Technology, Exton, Pa., USA). Both the MINICER and LABSTAR mills were equipped with zirconia-lined chamber and agitator, and used in a zeta-configuration. The MINICER horizontal mill used water as the seal fluid and 0.2 mm yttrium-stabilized zirconia as the milling media. The LABSTAR horizontal mill used 1-methoxy-2-propanol as the seal fluid and 0.5 mm yttrium-stabilized zirconia was used as the milling media. The seal fluid was cooled with house water to maintain the seal temperature below 95° C. The LME-4 mill had a stainless steel lined chamber and agitator, and was used in a molinex-configuration. The seal fluid was 1-methoxy-2-propanol and 0.5 mm yttrium-stabilized zirconia was used as the milling media. The milling media loading for all three mills was 80-90%.

Solvent was placed in a stainless steel container. The desired functionalizing ligand was added to the container. In the case of JAS ligand, it was preheated to 90° C. for ease of handling. A dispersant was used in some Examples. A DISPERMAT CN-10 high-shear disperser equipped with an "F-blade" (available from BYK-Gardner, Columbia, Md., USA) was lowered into the container and mixing was initiated. Calcite was then gradually added as a powder to the container and mixing continued until a uniform mixture was produced. The mixture was transferred to a jacketed vessel connected to a peristaltic pump (MASTERFLEX L/S, Cole-Parmer Instrument Company, Vernon Hills, Ill., USA) to circulate material between the vessel and the mill. The flow rate set point for the MINICER and LABSTAR mills was 250 milliliters per minute. The flow rate set point of the LME-4 mill was 600-800 milliliters per minute.

Samples were collected during the milling process. Early in the milling, the particle analysis showed a bimodal distribution. With time, the magnitude of the distribution peak for the larger particle size decreased and that of the smaller particle size increased. The milling was judged complete when the sample exhibited the single peak of the smaller particle size distribution.

Ligand Preparation.

Polyetheramine sulfonate ("JAS") was prepared as follows: To 100 g (0.167 mol) of polyetheramine (JEFFAMINE M-600 obtained from Huntsman, Mn=600) was added 17.88 g (0.146 mol) of melted propane sultone (purchased from TCI America). The mixture was heated to 80° C. and stirred for 16 hours. 1H NMR spectra shows complete consumption of the propane sultone. The sulfonic acid ligand (JAS) was isolated as a red brown liquid and used without further purification.

Polyetheramine Acid ("JAA") was prepared as follows: To a stirring solution of 150 g (0.250 mol) polyetheramine (JEFFAMINE M-600, Huntsman) in one liter of tetrahydrofuran was added 24 g (0.24 mol) succinic anhydride. After stirring for 16 hours, 1H NMR showed the succinic anhydride has been consumed. The tetrahydrofuran was removed under reduced pressure. The amide acid ligand (JAA) was isolated as a red-brown liquid and was used without purification.

Polyethylene Glycol Phosphonic Acid ("PEG-PO3H2") was prepared as follows: To 355.8 g (1.017 mol) of poly (ethylene glycol) methyl ether (purchased from Alfa Aesar, Mn=350) at 50° C. was drop-wise added 152.8 g (1.284 mol) of thionyl chloride with stirring. Evolved gases were vented through a trap containing 25% aqueous sodium hydroxide. After the addition was complete, the temperature of the reaction mixture was raised to 70° C. After 4 hours, nitrogen was slowly bubbled through the mixture as the temperature was raised to 90° C., and the reaction mixture was held at 90° C. overnight with continued nitrogen bubbling. Remaining volatiles were separated by heating for 2 hours at 120° C. under reduced pressure, leaving 338.7 g of a clear, light amber liquid. The 1H and 13C NMR spectra of the material were consistent with the structure of the desired product, and the crude chloride was used without further purification.

A mixture of 150.0 g (0.430 mol) of the crude chloride prepared above and 214.0 g (1.290 mol) of triethyl phosphite was heated at 170° C. After 3 days, an additional 100.0 g (0.600 mol) of triethyl phosphite was added, and the reaction temperature was increased to 180° C. After an additional 2 days at 180° C., a third portion of 100.0 g (0.600 mol) of triethyl phosphite was added, and heating at 180° C. was continued. After an additional 2 days, 13C NMR analysis of the reaction mixture indicated the absence of the starting chloride at 43 ppm. Diethyl ethylphosphonate and other volatiles were distilled to a final bath temperature of 130° C., b.p. 35-60° C. at 0.05 mm Hg, leaving 187.5 g of a clear, light yellow liquid. The 1H and 13C NMR spectra of the material were consistent with the structure of the desired product, and the crude diethyl phosphonate ester was used without further purification.

To a solution of 90.0 g (0.257 mol) of the crude diethyl phosphonate ester prepared above in 200 mL of dichloromethane was added 98.0 g (0.643 mol) of bromotrimethylsilane. After 18 hours at room temperature, the solution was concentrated under reduced pressure, and the intermediate silylphosphonate ester was dissolved in 250 mL of methanol. The resultant solution was stirred at room temperature for 2 hours. The solution was concentrated under reduced pressure, the concentrate was again dissolved in 250 mL of methanol, and the resultant solution was stirred overnight at room temperature. The mixture was concentrated as before, and after maintaining the concentrate under vacuum overnight to ensure complete separation of solvent, 80.0 g of a clear, light yellow liquid was obtained. The 1H and 13C NMR spectra of the final product were consistent with the structure of the desired phosphonic acid ligand. The 13C NMR spectrum of the product phosphonic acid (PEG-PO3H2) showed the carbon α (carbon alpha) to phosphorus as a doublet (JC-P=138.8 Hz) at 27.17 ppm.

Sample Set A: Milling of Agglomerated Calcite and JAS Ligand in Solvent.

The SOCAL 31 calcite powders were milled in MEK with the JAS ligand according to the Milling and Functionalization Process, as summarized in Table 9A. In addition to the JAS ligand, Sample P included 3.0 wt. % of the D111 dispersant.

The particle size distribution of the resulting surface-modified calcite was measured according to the Particle Size Procedure. The results are summarized in Table 9B. The mixtures with 1 weight percent JAS did not disperse the calcite particles effectively as illustrated in Table 9B, which shows multiple particle size peaks. The viscosity of these mixtures was high resulting in difficulty milling. The calcite particles were effectively dispersed with JAS concentrations between 5 and 20 weight percent, resulting in a nominal particle size of 250 nm. Mixed results were obtained with 3% JAS ligand (compare Samples C and D). The addition of a dispersant with 3% JAS ligand resulted in a good dispersion (see Sample P).

TABLE 9A

Milling conditions for Sample Set A.

| Sample I.D. | SOCAL 31 (g) | MEK (g) | JAS (g) | JAS (wt %)* | Mill temp. (° C.) | Mill time (hr:min) |
|---|---|---|---|---|---|---|
| A | 400 | 400 | 4 | 1 | 42 | 0:07 |
| B | 400 | 400 | 4 | 1 | 41 | 0:05 |
| C | 1,500 | 1500 | 45 | 3 | 37 | 1:00 |
| D | 400 | 400 | 12 | 3 | 40 | 0:30 |
| E | 400 | 400 | 20 | 5 | 40 | 0:15 |
| F | 2,000 | 2000 | 100 | 5 | 36 | 1:15 |
| G | 2,333 | 1500 | 175 | 7.5 | 30 | 1:30 |
| H | 400 | 400 | 30 | 7.5 | 40 | 0:30 |
| I | 1,250 | 1250 | 94 | 7.5 | 47 | 1:10 |
| J | 1,600 | 1503 | 120 | 7.5 | 40 | 1:30 |
| K | 1,500 | 1500 | 113 | 7.5 | 37 | 1:15 |
| L | 1,500 | 1500 | 113 | 7.5 | 35 | 1:00 |
| M | 400 | 400 | 40 | 10 | 40 | 0:30 |
| N | 400 | 400 | 80 | 20 | 40 | 0:45 |
| O | 1,850 | 1450 | 20 | 20 | 48 | 2:00 |
| P** | 800 | 800 | 24 | 3 | 37 | 1:30 |
| Q | 12,000 | 6495 | 600 | 5 | 23 | 2:00 |
| R | 12,000 | 6495 | 600 | 5 | N.R. | 2:30 |
| S | 12,000 | 6495 | 900 | 7.5 | 29 | 3:00 |
| T | 12,000 | 6495 | 900 | 7.5 | 26 | 1:40 |
| U | 12,000 | 6495 | 900 | 7.5 | 27 | 1:40 |

*weight percent based on weight of calcite.
**includes 3.0 wt. % D111 dispersant based on weight of calcite.
N.R. = Not recorded.

TABLE 9B

Particle size distribution for Example Set A.

| Ex. | Sample I.D. | mean size (nm) | Peak 1 (nm) | Peak 2 (nm) | Peak 1 (vol. %) | Peak 1 + 2 (vol. %) |
|---|---|---|---|---|---|---|
| CE-A1 | A | 4,747 | 296 | 1,729 | 54 | 71 |
| CE-A2 | B | 9,246 | 296 | 1,729 | 23 | 41 |
| A1 | C | 282 | 296 | — | 100 | 100 |
| CE-A3 | D | 338 | 296 | 766 | 91 | 100 |
| A2 | E | 254 | 259 | — | 100 | 100 |
| A3 | F | 256 | 298 | — | 100 | 100 |
| A4 | G | 254 | 259 | — | 100 | 100 |
| A5 | H | 244 | 259 | — | 100 | 100 |
| A6 | I | 254 | 259 | — | 100 | 100 |
| A7 | J | 256 | 299 | — | 100 | 100 |
| A8 | K | 254 | 296 | — | 100 | 100 |
| A9 | L | 259 | 259 | — | 100 | 100 |
| A10 | M | 243 | 259 | — | 100 | 100 |
| A11 | N | 254 | 259 | — | 100 | 100 |
| A12 | O | 255 | 259 | — | 100 | 100 |
| A13 | P | 278 | 296 | — | 100 | 100 |
| A14 | Q | 267 | 296 | — | 100 | 100 |
| A15 | R | 262 | 259 | — | 100 | 100 |
| A16 | S | 264 | 296 | — | 100 | 100 |
| A17 | T | 266 | 296 | — | 100 | 100 |
| A18 | U | 268 | 296 | — | 100 | 100 |

Sample Set B: Milling of a Variety of Calcites with Various Ligands.

Calcite aggregates were milled in a solvent with a ligand according to the Milling and Functionalization Process, as summarized in Table 10A. The particle size distribution of the resulting surface-modified calcite was measured according to the Particle Size Procedure. The results are summarized in Table 10B.

TABLE 10A

Milling conditions for Example Set B.

| Sample I.D. | Calcite Type | Calcite (g) | MEK (g) | Ligand Type | Ligand (g) | wt. %* | ° C. | hr:min |
|---|---|---|---|---|---|---|---|---|
| AA | SOCAL 31 | 400 | 400 | JAA | 30 | 7.5 | 40 | 0:15 |
| BB | SOCAL 31 | 400 | 400 | PEG-PO3H2 | 30 | 7.5 | 40 | 0:15 |
| CC | ALBAFIL | 12,000 | 6,465 | JAS | 900 | 7.5 | N.R. | 2:30 |
| DD | ALBAFIL | 1,512 | 1,512 | JAS | 151 | 10 | 34 | 3:00 |
| EE | MULTIFEX MM | 12,000 | 6,465 | JAS | 600 | 5 | 26 | 2:00 |

*weight percent based on weight of calcite.

TABLE 10B

Particle size distributions for Sample Set B.

| Ex. | Sample I.D. | mean size (nm) | Peak 1 (nm) | Peak 2 (nm) | Peak 1 (vol. %) | Peak 1 + 2 (vol. %) |
|---|---|---|---|---|---|---|
| B1 | AA | 248 | 259 | — | 100 | 100 |
| B2 | BB | 273 | 296 | — | 100 | 100 |
| B3 | CC | 363 | 389 | — | 100 | 100 |
| B4 | DD | 305 | 296 | — | 100 | 100 |
| B5 | EE | 269 | 296 | — | 100 | 100 |

Examples 43-46 and Comparative Examples CE-F and CE-G

Approximately 35 wt. % dry, surface-modified calcite particles were prepared and dispersed in EPON 828 curable epoxy resin as follows.
Oven Drying Process.

The calcite samples milled in methylethylketone (MEK) contained about 50 weight percent solvent. Such solvent-milled calcite samples were poured into shallow aluminum trays. A maximum of two trays were placed in a DESPATCH QMax forced air convection oven (Despatch, Minneapolis, Minn., USA) that was preheated to 120° C. After five minutes of being placed in the preheated oven, the samples were mixed with a wooden spatula to break up a skin that formed on the surface of the mixture. Liquid solvent was still visible in the sample after 5 minutes. After 10 minutes, the samples were again mixed with a wooden spatula to break-up the dried sample. No liquid was visible in the samples after 10 minutes. It is noted that there were airborne particles during drying for the 1% JAS mixtures but not for higher JAS concentrations. After 20 minutes, the dried samples were removed from the oven and again broken-up with a wooden spatula. A moisture analyzer (see Percent Solids) was used to verify that all solvent was removed. The dried solids formed a dry non-tacky cake.

Generally, the cake of dried nanoparticles was broken-up prior to compounding with a resin either manually with a pestle or automatically with an MF 10 Microfine grinder with MF 10.1 cutting-grinding head (IKA Works, Inc, Wilmington, Del., USA). However, this step was not necessary to achieve dispersibility.
Compounding Process.

First, the surface-modified nanocalcite dispersions prepared above were dried following the Oven Drying Process. Next, EPON 828 epoxy resin was preheated to 90° C. and placed in an unheated, jacketed vessel. The DISPERMAT CN-10 high-shear disperser was lowered into the vessel and mixing initiated at low speed (less than 1000 rpm). In the amounts summarized in Table 11A, while mixing, calcite premodified with JAS was incrementally added to the vessel. Once the premodified calcite was added, the mixer speed was increased to where mixing occurred without spattering, typically 4000-5500 rpm. The Examples were mixed for 20-30 minutes.

As summarized in Table 11B, particle analysis performed according the Particle Size Procedure showed that calcite premodified with 1 and 3 weight percent JAS did not fully disperse into the epoxy resin, which is consistent with the milling results without resin. Calcite premodified with 5-20 weight percent JAS did fully disperse into the epoxy resin using only a DISPERMAT CN-10 high-shear disperser. These results show calcite premodified with 5-20 weight percent JAS is self-dispersing into epoxy resin.

TABLE 11A

Compounding conditions.

| Ex. | Epoxy (g) | JAS-modified calcite Sample | JAS-modified calcite (g) | JAS-modified calcite wt. % | JAS wt. %* | Mixing ° C. | Mixing Min. |
|---|---|---|---|---|---|---|---|
| CE-F | 119 | B | 65 | 35 | 1 | 84 | 20 |
| CE-G | 119 | D | 66 | 36 | 3 | 87 | 20 |
| 43 | 119 | E | 68 | 36 | 5 | 75 | 30 |
| 44 | 119 | H | 69 | 37 | 7.5 | 63 | 20 |
| 45 | 119 | M | 71 | 37 | 10 | 54 | 20 |
| 46 | 119 | N | 80 | 40 | 20 | 69 | 20 |

*weight percent based on weight of calcite.

TABLE 11B

Particle size results.

| Ex. | Mean size (nm) | Peak 1 (nm) | Peak 2 (nm) | Peak 1 (vol. %) | Peak 1 + 2 (vol. %) |
|---|---|---|---|---|---|
| CE-F | 1,726 | 296 | 1,151 | 73 | 87 |
| CE-G | 3,631 | 259 | 8,816 | 73 | 100 |
| 43 | 241 | 259 | — | 100 | 100 |
| 44 | 240 | 259 | — | 100 | 100 |
| 45 | 235 | 259 | — | 100 | 100 |
| 46 | 235 | 259 | — | 100 | 100 |

Examples 48 Through 57

Higher loadings of JAS surface-modified calcite particles were oven-dried and dispersed in EPON 828 curable epoxy resin according to the Compounding Procedure. The compounding conditions are summarized in Table 12A.

TABLE 12A

Compounding conditions.

| Ex. | Epoxy (g) | JAS-modified calcite Sample | JAS-modified calcite (g) | JAS-modified calcite wt. % | JAS wt. %* | Mixing ° C. | Mixing Min. |
|---|---|---|---|---|---|---|---|
| 48 | 160 | E | 259 | 62 | 7.5 | 93 | 20 |
| 49 | 220 | I | 195 | 47 | 7.5 | 72 | 20 |
| 50 | 220 | I | 195 | 47 | 7.5 | 135 | 20 |
| 51 | 160 | I | 259 | 62 | 7.5 | 137 | 20 |
| 52 | 160 | I | 300 | 65 | 20 | 91 | 20 |
| 53 | 220 | O | 225 | 51 | 20 | 80 | 20 |
| 54 | 220 | O | 225 | 51 | 20 | 138 | 20 |
| 55 | 160 | O | 300 | 65 | 20 | 141 | 20 |
| 56 | 160 | P** | 255 | 61 | 3 | 83 | 20 |
| 57 | 160 | G | 255 | 61 | 5 | 145 | 20 |

*weight percent based on weight of calcite.
**includes 3.0 wt. % D111 dispersant based on weight of calcite.

Data collected according to the Particle Size Procedure are shown in Table 12B. For each sample, 100% of the particles fell within a single distribution peak.

TABLE 12B

Particle size results.

| Ex. | Mean size (nm) | Peak 1 (nm) | Peak 1 (vol. %) |
|---|---|---|---|
| 48 | 250 | 259 | 100 |
| 49 | 254 | 259 | 100 |
| 50 | 254 | 259 | 100 |
| 51 | 251 | 259 | 100 |
| 52 | 252 | 259 | 100 |
| 53 | 249 | 259 | 100 |

TABLE 12B-continued

Particle size results.

| Ex. | Mean size (nm) | Peak 1 (nm) | Peak 1 (vol. %) |
|---|---|---|---|
| 54 | 247 | 259 | 100 |
| 55 | 245 | 259 | 100 |
| 56 | 237 | 259 | 100 |
| 57 | 253 | 259 | 100 |

Examples 58 Through 60

A variety of surface-modified calcite dispersions were oven-dried and dispersed in EPON 828 curable epoxy resin using the Compounding Procedure described above. The SOCAL 31 calcite was used in Examples 58 and 59, while the ALBAFIL calcite was used in Example 60. The compounding conditions are summarized in Table 13A.

TABLE 13A

Compounding conditions.

| | Epoxy | surface-modified calcite | | | Ligand | Mixing | |
|---|---|---|---|---|---|---|---|
| Ex. | (g) | Sample | (g) | wt. % | wt. %* | ° C. | Min. |
| 58 | 119 | AA (JAA) | 69 | 37 | 7.5 | 91 | 20 |
| 59 | 119 | BB (PEG-PO3H2) | 69 | 37 | 7.5 | 89 | 20 |
| 60 | 105 | DD** (JAS) | 119 | 53 | 10 | 137 | 20 |

*weight percent based on weight of calcite.
**ALBAFIL calcite.

Data collected according to the Particle Size Procedure are shown in Table 13B. For each sample, 100% of the particles fell within a single distribution peak.

TABLE 13B

Particle size results.

| Ex. | Mean size (nm) | Peak 1 (nm) | Peak 1 (%) |
|---|---|---|---|
| 58 | 244 | 259 | 100 |
| 59 | 245 | 259 | 100 |
| 60 | 306 | 296 | 100 |

Examples 61 Through 66

JAS surface-modified calcite dispersions were oven-dried and dispersed in EPON 828 curable epoxy resin and a reactive diluent. The compositions were prepared according to the Compounding Procedure described above, except that 40 grams of the reactive diluent specified in Table 14 were added to the epoxy resin while stirring prior to the addition of 259 grams of the Sample I surface-modified calcite particles. The resulting resin systems contained 7.5 wt. % JAS based on the weight of calcite. The compounding conditions and the particle size data obtained according to the Particle Size Procedure are summarized in Table 14. For each sample, 100% of the particles fell within a single distribution peak.

TABLE 14

Compounding conditions and particle size data.

| Ex. | Epoxy (g) | Reactive Diluent | Mix ° C. | Mix Min. | Mean size (nm) | Peak 1 (nm) |
|---|---|---|---|---|---|---|
| 61 | 121 | Vinyl toluene | 83 | 20 | 254 | 296 |
| 62 | 120 | PEGDGE | 111 | 20 | 263 | 296 |
| 63 | 120 | EHGE | 80 | 20 | 265 | 308 |
| 64 | 121 | ECHM-ECHC | 109 | 20 | 266 | 303 |
| 65 | 120 | AGE | 72 | 20 | 257 | 300 |
| 66 | 121 | BGE | 68 | 20 | 260 | 296 |

Examples 67 Through 70

JAS surface-modified calcite dispersions were oven-dried and dispersed into a variety of curable epoxy resins, both with and without the CHDDGE reactive diluent. The compositions were prepared according to the Compounding Procedure described above, except that the reactive diluent specified in Table 15 was added to the epoxy resin while stirring prior to the addition of the surface-modified calcite particles.

Each of Examples 67 through 70 contained 259 grams of JAS-surface-modified SOCAL 31 calcite, resulting in 7.5 wt. % JAS based on the weight of calcite. The compounding conditions and the particle size data obtained according to the Particle Size Procedure are summarized in Table 15. For each sample, 100% of the particles fell within a single distribution peak.

TABLE 15

Compounding conditions and particle size data.

| | | Epoxy resin | | CHDDGE | Mixing | | Size (nm) | |
|---|---|---|---|---|---|---|---|---|
| Ex. | Sample | type | (g) | (g) | ° C. | Min. | mean | Peak 1 |
| 67 | J | EPON | 160 | — | 83 | 20 | 250 | 259 |
| 68 | J | 862 | 128 | 32 | 97 | 20 | 245 | 296 |
| 69 | L | EPON | 160 | — | 92 | 20 | 252 | 259 |
| 70 | L | 825 | 128 | 32 | 84 | 20 | 252 | 259 |

Example 71 was prepared as follows. VE 1398-5 vinyl ester resin (196 g) and 35.6 g of styrene (a reactive diluent) were placed in an unheated, jacketed vessel. A DISPERMAT CN-10 high-shear disperser was lowered into the vessel and mixing initiated at low speed (less than 1000 rpm). While mixing, 173.5 g of oven-dried SOCAL 31 calcite premodified with 7.5 wt. % PEG-PO3H2 based on the weight of the calcite were incrementally added to the vessel. Once all the calcite was added, the mixer speed was maximized to where mixing occurred without spattering, typically 4000-5500 rpm. Mixing continued for 30 minutes at a mixing temperature of 83° C. The resulting dispersion contained nanoparticles having a mean size of 252 nm and 100 vol. % of the particles fell within in single peak located at 259 nm.

Example 72 was prepared as follows. EPON 828 epoxy resin (120 g) was preheated to 90° C. for ease of handling and placed in a plastic beaker. EPON 1001 epoxy resin (40 g) was added as a solid to the beaker, and the beaker was placed in a microwave oven for one minute to melt the solid resin. The two epoxies were then mixed with a wooden spatula and formed a clear solution. Surface-modified calcite (259 g of Sample L) was then oven-dried and combined with the epoxy mixture according to the Compounding Procedure.

Example 73 was prepared as follows. EPON 825 epoxy resin (128 g) was preheated to 90° C. for ease of handling and placed in a plastic beaker. ARALDITE 1273 epoxy resin (40 g) was added as a solid to the beaker, and the beaker was placed in a microwave oven for one minute to melt the solid resin. The two epoxies were then mixed with a wooden spatula and formed a clear solution. Surface-modified calcite (259 g of Sample L) was then oven-dried and combined with the epoxy mixture according to the Compounding Procedure.

Both Examples 72 and 73 contained 7.5 wt. % JAS based on the weight of calcite. The compounding conditions and the particle size data obtained according to the Particle Size Procedure are summarized in Table 16. For each sample, 100% of the particles fell within a single distribution peak.

TABLE 16

Compounding conditions and particle size data.

| Ex. | Resins | | Mix ° C. | Mix Min. | Mean (nm) | Peak 1 (nm) |
|---|---|---|---|---|---|---|
| 72 | EPON 828 | EPON 1001 | 116 | 30 | 256 | 259 |
| 73 | EPON 828 | ARALDITE 1273 | 104 | 30 | 252 | 259 |

Comparative Examples H-L

Comparative Examples H and I were prepared as follows. EPON 828 epoxy resin and JAS were preheated to 90° C. for ease of handling. EPON 828 epoxy resin was placed in a heated, jacketed vessel. JAS ligand was added to the vessel. The DISPERMAT CN-10 high-shear disperser was lowered into the vessel and mixing initiated at low speed (less than 1000 rpm). While mixing, unmodified SOCAL 31 calcite was incrementally added to the vessel. Once all the calcite was added, the mixer speed was maximized to where mixing occurred without spattering, typically 4000-5500 rpm.

Comparative Example J was prepared as follows. EPON 828 epoxy resin and JAS were preheated to 90° C. for ease of handling. EPON 828 epoxy resin was placed in a heated, jacketed vessel. JAS ligand was added to the vessel. A Ross High Shear Rotor-Stator mixer (model ME 100 Lc) with slotted stator head (Charles Ross & Son Co., Hauppauge, N.Y.) was lowered into the vessel and mixing initiated. While mixing, unmodified SOCAL 31 calcite, which had been preheated to 250° C. for one hour, was incrementally added to the vessel. Once all the calcite was added, the mixer speed was adjusted to a setting of "5," where mixing occurred without spattering.

Comparative Example K was prepared as follows. EPON 828 epoxy resin was preheated to 90° C. for ease of handling and placed in an unheated, jacketed vessel. The DISPERMAT CN-10 high-shear disperser was lowered into the vessel and mixing initiated at low speed (less than 1000 rpm). While mixing, calcite premodified with stearic acid (NPCC 201) was incrementally added to the vessel. The mixture immediately formed a whipped cream-like consistency that held its form but was dense. The mixing was ineffective with the mixture accumulating away from the mixing blade and near the walls of the vessel. Mixing was continued for 20 minutes.

Comparative Example L was prepared as follows. 2-EHA, a curable acrylate resin, was placed in an unheated, jacketed vessel. The DISPERMAT CN-10 high-shear disperser was lowered into the vessel and mixing initiated at low speed (less than 1000 rpm). While mixing, calcite premodified with stearic acid (NPCC 201) was incrementally added to the vessel. The mixture immediately formed a whipped cream-like consistency but possessed a low viscosity. The mixing was ineffective with the mixture accumulating away from the mixing blade and near the walls of the vessel. Mixing was ceased after 5 minutes.

TABLE 17A

Compounding conditions for Comparative Examples CE-H through CE-L.

| | particles | | Resin | | Treatment | | | mixing | |
|---|---|---|---|---|---|---|---|---|---|
| Ex. | type | (g) | type | (g) | type | (g) | wt. % | ° C. | min. |
| CE-H | SOCAL 31 | 240 | EPON 828 | 160 | JAS | 48 | 20 | 141 | 20 |
| CE-I | SOCAL 31 | 40 | EPON 828 | 74 | JAS | 8 | 20 | N.R. | 20 |
| CE-J | SOCAL 31 | 166 | EPON 828 | 220 | JAS | 14 | 8.3 | 141 | 30 |
| CE-K | NPCC 201 | 180 | EPON 828 | 220 | Stearic acid | — | 4.8 | 85 | 20 |
| CE-L | NPCC 201 | 178 | 2-EHA | 119 | Stearic acid | — | 4.8 | N.R. | 5 |

N.R. = not recorded

TABLE 17B

Particle size data obtained according to the particle Size Procedure.

| Ex. | Mean (nm) | Peak 1 (nm) | Peak 2 (nm) | Peak 1 (%) | Peak 1 + 2 (%) |
|---|---|---|---|---|---|
| CE-H | 1,033 | 259 | 1,151 | 56 | 100 |
| CE-I | 1,786 | 259 | 4,986 | 56 | 100 |
| CE-J | 2,768 | 296 | 1,729 | 58 | 83 |
| CE-K | 7,639 | 296 | 1,981 | 15 | 100 |
| CE-L | 10,855 | 296 | 1,981 | 10 | 16 |

Example 74 was prepared as follows. EPON 828 epoxy resin (256 g) was preheated to 90° C. for ease of handling and placed in a heated, jacketed vessel. JAS was added to the vessel to increase the JAS concentration from 5 weight percent in the milled dispersion to 20 weight percent in the nanocomposite. The JAS was preheated to 90° C. for ease of handling. The DISPERMAT CN-10 high-shear disperser was lowered into the vessel and mixing initiated at low speed (less than 1000 rpm). While mixing, 180 g of oven-dried SOCAL 31 calcite premodified with 5 weight percent JAS and oven-dried (Sample G) was incrementally added to the vessel. Once all the calcite was added, the mixer speed was maximized to where mixing occurred without spattering, typically 4000-5500 rpm.

Examples 48, 51, 55, 56, 57, 60, 67, and 74 were degassed at 80° C. and 1330 Pa (10 torr). The degassed nanoparticle-containing epoxy resins were cured according to the Curing Process as follows: Samples were cured using an epoxy curing agent, (DETDA) at the level of 38 parts by weight curative per 100 parts epoxy resin (PPH). The components were adjusted so that the final calcite concentration was 35 weight percent. In addition, the samples were cured in a forced air oven using the following protocol: 75° C. for 3 hours, 125° C. for 2 hours, and 150° C. for 2 hours.

As summarized in Table 18, the cured samples were tested according to the Glass Transition Temperature Procedure and Fracture Toughness Procedure.

TABLE 18

Mechanical properties of cured nanocomposite materials.

| Description | Calcite Sample | JAS wt. %* | Tg (° C.) | $K_{Ic}$ (MPa-m$^{1/2}$) |
|---|---|---|---|---|
| Ex. 57 - cured | G | 5 | 126 | 1.66 |
| Ex. 48 - cured | E | 7.5 | 123 | 2.35 |
| Ex. 51 - cured | I | 7.5 | 124 | 2.43 |
| Ex. 55 - cured | O | 20 | 103 | 2.39 |
| Ex. 56 - cured | P** | 3 | N.T. | 1.25 |
| Ex. 60 - cured | V | 10 | 121 | 3.12 |
| Ex. 67 - cured | J | 7.5 | 112 | 1.72 |
| Ex. 74 - cured | G | 20 | 105 | 2.77 |

*based on the weight of calcite
**includes 3.0 wt. % D111 dispersant based on weight of calcite.
N.T. = not tested As an alternative to oven-drying the surface-modified nanocalcite, the present inventors surprisingly discovered that the dispersions could be sprayed-dried and then dispersed in, e.g., a curable resin.

Spray Drying Process. Spray drying was performed in a SD-20 Spray Dryer (SKS Spray Drying Systems, Randallstown, Md., USA). The 1.2 m (4 foot) diameter by 3.7 m (12 foot) high spray dryer was operated in a closed loop configuration to maintain an inert atmosphere. The milled dispersion of JAS-modified calcite in MEK, 50-65 wt. % calcite, was pumped from a five gallon pail to the spray dryer by a peristaltic pump (MASTERFLEX L/S, Cole Parmer Instrument Company). The flow rate was set at 200-225 g/min. The dispersion was sprayed upward in the spray dryer via an atomizing nozzle. The inlet temperature of the spray dryer was 138-142° C. (281-288° F.) and the outlet temperature was 76-78° C. (169-173° F.). The spray-dried, JAS-modified calcite powder was collected in the bag house.

In each of the following examples, a dispersion of surface-modified calcite was spray-dried to produce dry, surface-modified calcite. The dry, surface-modified calcite was then compounded into resin.

For Examples 75 and 76, 160 g of EPON 828 epoxy resin were preheated to 90° C. and placed in an unheated, jacketed vessel. The DISPERMAT CN-10 high-shear disperser was lowered into the vessel and mixing initiated at low speed (less than 1000 rpm). In the amounts summarized in Table 19A, spray-dried calcite premodified with JAS was incrementally added to the vessel while mixing. SOCAL 31 calcite was used for Example 75, while the ALBAFIL calcite was used for Example 76. Once the premodified calcite was added, the mixer speed was increased to where mixing occurred without spattering, typically 4000-5500 rpm. The Examples were mixed for 20 minutes.

For Example 77 and 78, thirty-two grams of a reactive diluent were added to 128 grams of EPON 828 epoxy resin, followed by the addition of spray-dried SOCAL 31 calcite premodified with JAS to the vessel while mixing.

For Examples 79 and 80, spray-dried SOCAL 31 calcite modified with JAS ligand (259 g) was added to EPON 826 epoxy resin. Example 80 also included 32 grams of CHDDGE reactive diluent.

For Example 81, spray-dried SOCAL 31 calcite modified with JAS ligand (253 g) was added to 160 g of EPON 826 epoxy resin.

For Example 82, spray-dried SOCAL 31 calcite modified with JAS ligand (4015 g) was added to 2000 grams of reactive diluent, BDDGE, without the presence of epoxy resin.

TABLE 19A

Compounding conditions.

| | | JAS-modified calcite | | JAS | Mixing | |
|---|---|---|---|---|---|---|
| Ex. | Reactive Diluent I.D. | Sample | wt. % | wt. %* | ° C. | Min. |
| 75 | none | R | 60 | 5 | 104 | 20 |
| 76 | none | CC | 62 | 7.5 | 97 | 20 |
| 77 | CHDDGE | Q | 61 | 5 | 88 | 20 |
| 78 | BDDGE | Q | 61 | 5 | 66 | 20 |
| 79 | None | S | 62 | 7.5 | N.R. | 20 |
| 80 | CHDDGE | T | 62 | 7.5 | 102 | 20 |
| 81 | CHDDGE | Q | 61 | 5 | 98 | 20 |
| 82 | BDDGE | U | 62 | 7.5 | 45 | 20 |

*based on the weight of calcite

Data collected according to the Particle Size Procedure are shown in Table 19B. For each sample, 100% of the particles fell within a single distribution peak.

TABLE 19B

Particle size results.

| Ex. | Mean size (nm) | Peak 1 (nm) | Peak 1 (%) |
|---|---|---|---|
| 75 | 243 | 259 | 100 |
| 76 | 253 | 259 | 100 |
| 77 | 258 | 259 | 100 |
| 78 | 247 | 259 | 100 |
| 79 | 293 | 296 | 100 |
| 80 | 253 | 259 | 100 |
| 81 | 254 | 259 | 100 |
| 82 | 254 | 259 | 100 |

Example 83 was prepared as follows. Sprayed dried MULTIFEX MM calcite modified with JAS ligand (90 g of Sample EE) was added to 60 grams of EPON 828 epoxy resin in a speedmixer cup. The cup was loaded and balanced into the SPEEDMIXER (Model ARV-310 Vacuum Mixer, Thinky USA Inc, Laguna Hills, Calif., USA) mixer and mixed for two minutes at 2000 revolutions per minute. Data collected according to the Particle Size Procedure showed 100% of the particles in a single peak at 259 nm with a mean particle size of 254 nm.

Examples 84-86 were prepared as follows. As summarized in Table 20, a liquid epoxy resin (EPON 828 or EPON 862) was preheated to 90° C. for ease of handling. The preheated epoxy was placed in a plastic beaker. A solid epoxy (ARALDITE 1273 or ARALDITE 1280) was added to the beaker and placed in a microwave oven for one minute to melt the solid epoxy. The two epoxies were then mixed with a wooden spatula and formed a clear solution.

The contents of the plastic beaker were then transferred to a jacketed vessel and the DISPERMAT CN-10 high-shear disperser was lowered into the mixture and mixing initiated. JAS-modified calcite (259 g of Sample EE, MULTIFEX MM calcite surface-modified with 5 wt. % JAS ligand) was then gradually added to the vessel. The samples were mixed for 20 minutes. Data collected according to the Particle Size Procedure are shown in Table 20. For each sample, 100% of the particles fell within a single distribution peak.

TABLE 20

Compounding conditions and particle size data.

| Ex. | Resins | | JAS wt. %* | Mix ° C. | Mix Min. | Mean (nm) | Peak 1 (nm) |
|---|---|---|---|---|---|---|---|
| 84 | 120 g EPON 828 | 40 g ARALDITE 1273 | 5 | 127 | 20 | 253 | 259 |
| 85 | 120 g EPON 828 | 40 g ARALDITE 1280 | 5 | 129 | 20 | 248 | 259 |
| 86 | 96 g EPON 862 | 64 g ARALDITE 1280 | 5 | 127 | 20 | 241 | 259 |

The compositions of Examples 87 and 88 were prepared according to the Compounding Process described above. JAS surface-modified calcite dispersions were dried and dispersed into reactive diluents without the presence of an epoxy resin. For Example 87, 259 grams of oven-dried SOCAL 31 calcite modified with 7.5% JAS ligand was mixed with 160 g of the CHDDGE reactive diluent. For Example 88, the 4015 grams of spray-dried SOCAL 31 modified with 7.5% JAS ligand was mixed with 2000 g of the BDDGE reactive diluent.

The compounding conditions and the particle size data obtained according to the Particle Size Procedure are summarized in Table 21. For each sample, 100% of the particles fell within a single distribution peak.

TABLE 21

Compounding conditions and particle size data.

| Ex. | Sample | Mixing (° C.) | Mixing (Min.) | size (nm) mean | size (nm) Peak 1 |
|---|---|---|---|---|---|
| 87 | C9 | 61 | 20 | 251 | 296 |
| 88 | C14 | 46 | 20 | 255 | 259 |

Various modifications and alterations of this invention will become apparent to those skilled in the art without departing from the scope and spirit of this invention.

Various modifications and alterations of this invention will become apparent to those skilled in the art without departing from the scope and spirit of this invention.

What is claimed is:

1. A method of making a particle-filled resin, the method comprising:
    (a) surface-modifying calcite particles to form surface-modified particles;
    (b) drying the surface-modified particles; and
    (c) dispersing the dried, surface-modified particles in a resin without milling and without addition of solvent to form the particle-filled resin;
    wherein (a) is achieved by one of the following:
    (a1) wet milling unmodified calcite particles and subsequently contacting the milled calcite particles with a surface-modifying agent;
    (a2) contacting unmodified calcite particles with a surface-modifying agent and subsequently wet milling the contacted particles; and
    (a3) wet milling a mixture of unmodified calcite particles and a surface-modifying agent;
    wherein the wet milling of (a1), (a2), and (a3) reduces the size of the calcite particles to a mean size of no greater than 400 nm, as measured by laser diffraction of a 1% solids solution in acetone, using an optical model with a refractive index of 1.6000 for calcite and 1.3591 for acetone; and
    wherein the mean size of the surface-modified particles of the particle-filled resin is no greater than 400 nm.

2. The method according to claim 1, wherein (a) is achieved by (a3) wet milling a mixture of unmodified calcite particles and a surface-modifying agent.

3. The method according to claim 1, wherein the resin comprises a curable resin.

4. The method according to claim 1, wherein the surface-modifying agent comprises a binding group which bonds to the calcite and a compatiblizing segment comprising at least one of a polyethylene oxide, a polypropylene oxide, and a polyester.

5. The method according to claim 1, wherein the surface-modifying agent is a polyetheramine.

6. The method according to claim 5, wherein the resin is an epoxy resin and the surface-modified particles comprise 5-20 weight percent of polyetheramine, based on the weight of calcite, to enable the surface-modified particles to fully disperse into the epoxy resin using only a high-shear disperser.

7. The method according to claim 1, wherein the surface-modifying agent is a phosphonic acid.

8. The method according to claim 1, wherein (b) is achieved by spray-drying.

9. The method according to claim 8, wherein said spray-drying comprises spraying the surface-modified particles upward in a spray dryer via an atomizing nozzle.

10. The method according to claim 9, wherein the resin is an epoxy resin, the surface-modifying agent is a polyetheramine, and the surface-modified particles comprise 5-20 weight percent of polyetheramine, based on the weight of calcite, to enable the surface-modified particles to fully disperse into the epoxy resin using only a high-shear disperser.

11. The method according to claim 1, wherein 100% of the surface-modified particles fall within a single particle size distribution peak.

* * * * *

UNITED STATES PATENT AND TRADEMARK OFFICE
CERTIFICATE OF CORRECTION

PATENT NO.         : 9,512,264 B2
APPLICATION NO.    : 13/991634
DATED              : December 6, 2016
INVENTOR(S)        : Peter Condo It is certified that error appears in the above-identified patent and that said Letters Patent is hereby corrected as shown below:

On the Title Page

In Column 2, item (56) under (Other Publications)
Line 16, delete "Boshen" and insert -- Goshen --, therefor.

In Column 2, item (57) under (Abstract)
Line 4, delete "compatiblizing" and insert -- compatibilizing --, therefor.
Lines 4-5, delete "compatiblizing" and insert -- compatibilizing --, therefor.

In the Specification

Column 1
Line 16, delete "compatiblizing" and insert -- compatibilizing --, therefor.
Line 17, delete "compatiblizing" and insert -- compatibilizing --, therefor.

Column 2
Line 39, delete "dispersable" and insert -- dispersible --, therefor.
Line 45, delete "compatiblizing" and insert -- compatibilizing --, therefor.
Line 47, delete "compatiblizing" and insert -- compatibilizing --, therefor.
Line 49, delete "compatiblizing" and insert -- compatibilizing --, therefor.
Line 52, delete "compatiblizing" and insert -- compatibilizing --, therefor.
Line 55, delete "compatiblizing" and insert -- compatibilizing --, therefor.
Line 59, delete "compatiblizing" and insert -- compatibilizing --, therefor.
Line 63, delete "compatiblizing" and insert -- compatibilizing --, therefor.

Column 3
Line 2, delete "compatiblizing" and insert -- compatibilizing --, therefor.
Line 4, delete "compatiblizing" and insert -- compatibilizing --, therefor.
Line 11, delete "compatiblizing" and insert -- compatibilizing --, therefor.

Signed and Sealed this
Twenty-eighth Day of February, 2017

Michelle K. Lee
*Director of the United States Patent and Trademark Office*

Line 15, delete "compatiblizing" and insert -- compatibilizing --, therefor.

Column 4
Line 67, delete "compatiblizing" and insert -- compatibilizing --, therefor.

Column 5
Lines 4-5, delete "compatiblizing" and insert -- compatibilizing --, therefor.
Line 6, delete "compatiblizing" and insert -- compatibilizing --, therefor.
Line 10, delete "compatiblizing" and insert -- compatibilizing --, therefor.
Lines 17-18, delete "compatiblizing" and insert -- compatibilizing --, therefor.
Line 19, delete "compatiblizing" and insert -- compatibilizing --, therefor.

Column 6
Line 5, delete "bismalimide" and insert -- bismaleimide --, therefor.

Column 15
Line 22, delete "molinex-" and insert -- moulinex- --, therefor.

Column 17
Line 40, delete "molinex-" and insert -- moulinex- --, therefor.

Column 18
Line 46, delete "molinex-" and insert -- moulinex- --, therefor.

Column 22
Line 48, delete "calorimeter" and insert -- Calorimeter --, therefor.

Column 23
Line 13, delete "molinex-" and insert -- moulinex- --, therefor.

In the Claims

Column 36
Line 24, in Claim 4, delete "compatiblizing" and insert -- compatibilizing --, therefor.